United States Patent
Martin et al.

(10) Patent No.: US 11,321,096 B2
(45) Date of Patent: May 3, 2022

(54) HARDWARE UNIT FOR PERFORMING MATRIX MULTIPLICATION WITH CLOCK GATING

(71) Applicant: Imagination Technologies Limited, Kings Langley (GB)

(72) Inventors: Christopher Martin, Leighton Buzzard (GB); Azzurra Pulimeno, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 450 days.

(21) Appl. No.: 16/180,181

(22) Filed: Nov. 5, 2018

(65) Prior Publication Data
US 2019/0227807 A1 Jul. 25, 2019

(30) Foreign Application Priority Data

Nov. 3, 2017 (GB) ..................................... 1718296

(51) Int. Cl.
*G06F 9/302* (2018.01)
*G06F 17/16* (2006.01)
(Continued)

(52) U.S. Cl.
CPC .............. *G06F 9/3869* (2013.01); *G06F 7/50* (2013.01); *G06F 7/523* (2013.01); *G06F 7/5443* (2013.01);
(Continued)

(58) Field of Classification Search
CPC .... G06F 9/3824; G06F 9/3869; G06F 9/3001; G06F 9/30036; G06F 7/50; G06F 7/523;
(Continued)

(56) References Cited

U.S. PATENT DOCUMENTS

| 4,799,183 A | 1/1989 | Nakano et al. |
| 10,140,574 B2 * | 11/2018 | Henry .................... G06N 3/082 |

(Continued)

FOREIGN PATENT DOCUMENTS

| CN | 102918495 A | 2/2013 |
| CN | 103793203 A | 5/2014 |

(Continued)

OTHER PUBLICATIONS

"Lower Power Auto Gated Flip-Flop Design Using Clock Gating Technique" by Aparna et al. IJSRET, ISSN 2278-0882 vol. 4 Issue 3, Mar. 2015 pp. 192-196, Fig.2 (Year: 2015).*

(Continued)

*Primary Examiner* — Daniel H Pan
(74) *Attorney, Agent, or Firm* — Potomac Law Group, PLLC; Vincent M DeLuca

(57) ABSTRACT

Hardware units and methods for performing matrix multiplication via a multi-stage pipeline wherein the storage elements associated with one or more stages of the pipeline are clock gated based on the data elements and/or portions thereof that known to have a zero value (or can be treated as having a zero value). In some cases, the storage elements may be clock gated on a per data element basis based on whether the data element has a zero value (or can be treated as having a zero value). In other cases, the storage elements may be clock gated on a partial element basis based on the bit width of the data elements. For example, if bit width of the data elements is less than a maximum bit width for the data elements then a portion of the bits related to that data element can be treated as having a zero value and a portion of the storage elements associated with that data element may not be clocked. In yet other cases the storage elements may be clock gated on both a per element and a partial element basis.

20 Claims, 15 Drawing Sheets

(51) Int. Cl.
  *G06N 3/04*   (2006.01)
  *G06N 20/00*  (2019.01)
  *G06F 9/38*   (2018.01)
  *G06N 3/063*  (2006.01)
  *G06F 7/544*  (2006.01)
  *G06F 7/50*   (2006.01)
  *G06F 7/523*  (2006.01)

(52) U.S. Cl.
  CPC ............ *G06F 9/3824* (2013.01); *G06F 17/16* (2013.01); *G06N 3/0454* (2013.01); *G06N 3/063* (2013.01); *G06N 20/00* (2019.01)

(58) Field of Classification Search
  CPC .... G06F 7/5443; G06F 17/16; G06F 17/5045; G06F 17/5054; G06F 17/5068; G06F 17/5072; G06F 17/5081; G06N 3/04; G06N 3/08; G06N 3/063; G06N 20/00; G06N 20/10; G06N 20/20
  USPC ........ 712/223, 224, 221, 227; 708/501, 523, 708/607; 716/138, 139, 119; 706/15, 25, 706/26, 27, 12
  See application file for complete search history.

(56) References Cited

U.S. PATENT DOCUMENTS

| | | | |
|---|---|---|---|
| 2002/0002573 A1* | 1/2002 | Landers | G06F 7/49 708/501 |
| 2007/0046804 A1* | 3/2007 | Hirano | H04N 5/23293 348/333.01 |
| 2010/0017635 A1 | 1/2010 | Barowski et al. | |
| 2012/0287989 A1 | 11/2012 | Budagavi et al. | |
| 2013/0138711 A1 | 5/2013 | Sugisawa | |
| 2014/0365548 A1 | 12/2014 | Mortensen | |
| 2016/0358069 A1* | 12/2016 | Brothers | G06F 7/764 |
| 2018/0293691 A1* | 10/2018 | Nurvitadhi | G06F 9/3001 |
| 2019/0012170 A1* | 1/2019 | Qadeer | G06N 3/0454 |

FOREIGN PATENT DOCUMENTS

| | | |
|---|---|---|
| EP | 2525284 A1 | 11/2012 |
| GB | 2490914 A | 11/2012 |

OTHER PUBLICATIONS

Edge-triggered Latches: Flip-flops. All About Circuits Chapter 10, pp. 1-7. (www.allaboutcircuits.com/textbook/digital/chpt-10/edge-triggered-latches-flip-flops/) (Year: 2020).*

Electronics Tutorials. Sequential Logic. Conversion-of-flip-flops, pp. 1-16. (www.electronics-tutorials.ws/sequential/conversion-of-flip-flops.html) (Year: 2020).*

Clock gating, Wikipedia, pp. 1-3. (en.wikipedia.org/wiki/Clock_gating) (Year: 2019).*

7.3. Clock gating. Excerpt from Chapter 7: Getting the Design Ready for the Prototype, FPGA-Based Prototyping Methodology Manual (m.eet.com/media/1157354/fpmm%20-%20part%201.pdf) (Year: 2011).*

Ivan Ratkovi et al. "A Fully Parameterizable Low Power Design of Vector Fused Multiply-Add Using Active Clock-Gating Techniques" Aug. 8-10, 2016 (dl.acm.org/doi/10.1145/2934583.2934587) (Year: 2016).*

Brooks et al; "Value-based clock gating and operation packing: dynamic strategies for improving processor power and performance"; ACM Transactions on Computer Systems (TOCS); vol. 18; No. 2; May 1, 2000; pp. 89-126.

Preiss et al; "Advanced Clockgating Schemes for Fused-Multiply-Add-Type Floating-Point Units"; 2009 19th IEEE International Symposium on Computer Arithmetic; Jun. 8, 2009; pp. 48-56.

* cited by examiner

| Arithmetic Operation | D1 Zero/Treated as Zero | D2 Zero/Treated as Zero | Output Element Zero/Treated as Zero |
|---|---|---|---|
| × | N | N | N |
| × | Y | N | Y |
| × | N | Y | Y |
| × | Y | Y | Y |
| + | N | N | N |
| + | Y | N | N |
| + | N | Y | N |
| + | Y | Y | Y |

FIG. 5

INPUT TO MULTIPLIERS (MAXIMUM BIT WIDTH = 16)

| BIT WIDTH D1 | BIT WIDTH D2 | D1 BLOCKS CLOCK GATED | D2 BLOCKS CLOCK GATED |
|---|---|---|---|
| 4 | 4 | 2, 1, 0 | 2, 1, 0 |
| 4 | 8 | 2, 1, 0 | 1, 0 |
| 4 | 12 | 2, 1, 0 | 0 |
| 4 | 16 | 2, 1, 0 | -- |
| 8 | 4 | 1, 0 | 2, 1, 0 |
| 8 | 8 | 1, 0 | 1, 0 |
| 8 | 12 | 1, 0 | 0 |
| 8 | 16 | 1, 0 | -- |
| 12 | 4 | 0 | 2, 1, 0 |
| 12 | 8 | 0 | 1, 0 |
| 12 | 12 | 0 | 0 |
| 12 | 16 | 0 | -- |
| 16 | 4 | -- | 2, 1, 0 |
| 16 | 8 | -- | 1, 0 |
| 16 | 12 | -- | 0 |
| 16 | 16 | -- | -- |

| D1/D2 | Bits 15-12 | Bits 11-8 | Bits 7-4 | Bits 3-0 |
|---|---|---|---|---|
| | BLOCK 3 | BLOCK 2 | BLOCK 1 | BLOCK 0 |

INPUT TO ADDERS OF SECOND STAGE (MAXIMUM BIT WIDTH = 16)

| D1 BIT WITH | D2 BIT WIDTH | D1 BLOCKS NOT GATED | D2 BLOCKS NOT GATED |
|---|---|---|---|
| 4 | 4 | 5, 4, 3, 2, 1, 0 | 5, 4, 3, 2, 1, 0 |
| 4 | 8 | 4, 3, 2, 1, 0 | 4, 3, 2, 1, 0 |
| 4 | 12 | 3, 2, 1, 0 | 3, 2, 1, 0 |
| 4 | 16 | 2, 1, 0 | 2, 1, 0 |
| 8 | 4 | 4, 3, 2, 1, 0 | 4, 3, 2, 1, 0 |
| 8 | 8 | 3, 2, 1, 0 | 3, 2, 1, 0 |
| 8 | 12 | 2, 1, 0 | 2, 1, 0 |
| 8 | 16 | 1, 0 | 1, 0 |
| 12 | 4 | 3, 2, 1, 0 | 3, 2, 1, 0 |
| 12 | 8 | 2, 1, 0 | 2, 1, 0 |
| 12 | 12 | 1, 0 | 1, 0 |
| 12 | 16 | 0 | 0 |
| 16 | 4 | 2, 1, 0 | 2, 1, 0 |
| 16 | 8 | 1, 0 | 1, 0 |
| 16 | 12 | 0 | 0 |
| 16 | 16 | -- | -- |

| D1/D2 | Bits 31-28 | Bits 27-24 | Bits 23-20 | Bits 19-16 | Bits 15-12 | Bits 11-8 | Bits 7-4 | Bits 3-0 |
|---|---|---|---|---|---|---|---|---|
| | BLOCK 7 | BLOCK 6 | BLOCK 5 | BLOCK 4 | BLOCK 3 | BLOCK 2 | BLOCK 1 | BLOCK 0 |

FIG. 9

HARDWARE UNIT FOR PERFORMING MATRIX MULTIPLICATION WITH CLOCK GATING

BACKGROUND

Matrix multiplication is the multiplication of a first matrix A and a second matrix B to produce a third matrix C. If A is an a×b matrix and B is a b×c matrix as shown below $$A = \begin{pmatrix} A_{11} & \cdots & A_{1b} \\ \vdots & \ddots & \vdots \\ A_{a1} & \cdots & A_{ab} \end{pmatrix}$$

$$B = \begin{pmatrix} B_{11} & \cdots & B_{1c} \\ \vdots & \ddots & \vdots \\ B_{b1} & \cdots & B_{bc} \end{pmatrix}$$

then the result of the matrix multiplication is an a×c matrix C as shown below $$C = \begin{pmatrix} C_{11} & \cdots & C_{1c} \\ \vdots & \ddots & \vdots \\ C_{a1} & \cdots & C_{ac} \end{pmatrix}$$

where each element $C_{ij}$ of matrix C is calculated by multiplying the elements in the $i^{th}$ row of matrix A against the elements in the $j^{th}$ column of matrix B and summing the results as shown in equation (1):

$$C_{ij} = \Sigma_{k=1}^{b} A_{ik} B_{kj} \quad (1)$$

Matrix multiplication is a key operation in many applications. For example, matrix multiplication can be used to compute the convolution of input data and weights in a deep neural network (DNN). However, matrix multiplication can be time consuming, especially for large matrices. There is therefore a need for hardware that is configured to perform matrix multiplication in an efficient manner, i.e. in a manner that requires less silicon area or less processing power when operating. Moreover, different matrix multiplications (e.g. in terms of matrix sizes etc.) may be performed for different applications. There is therefore also a need for hardware configured to perform matrix multiplication to be flexible to support a variety of matrix multiplications.

The embodiments described below are provided by way of example only and are not limiting of implementations which solve any or all of the disadvantages of known hardware units to perform matrix multiplication.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are hardware units and methods for performing matrix multiplication via a plurality of pipeline stages wherein each stage is preceded by a plurality of storage elements for storing data elements input to that stage and the storage elements associated with one or more stages of the pipeline are clock gated based on whether the data elements and/or portions thereof have a zero value (or can be treated as having a zero value). In some cases, the storage elements may be clock gated on a per data element basis based on whether the data element has a known zero value (or can be treated as having a zero value). In other cases, the initial data elements may be represented in a fixed point number format comprising an exponent and a mantissa bit width and the mantissa bit width may vary between matrix multiplications or even between hardware passes of the same matrix multiplication. In these cases, the storage elements may be clock gated on a partial data element basis based on the mantissa bit widths of the initial data elements input into the hardware. For example, if the mantissa bit width of an initial data element is less than a maximum mantissa bit width then a portion of the bits related to that data element can be treated as having a zero value and a portion of the storage elements associated with that data elements may not be clocked. In yet other cases the storage elements may be clock gated on both a per element and a partial element basis.

A first aspect provides a hardware unit to perform a matrix multiplication, the hardware unit comprising: a multiplier stage comprising a plurality of multipliers, each multiplier configured to multiply a first data element and a second data element to produce a multiplication data element; one or more adder stages following the multiplier stage that form an adder tree to produce a sum of the multiplication data elements, each adder stage comprising one or more adders configured to add at least two data elements output by a previous stage to produce an addition data element; wherein at least one multiplier and/or at least one adder is preceded by a storage element corresponding to each bit of the data elements input to the at least one adder or the at least one multiplier; and control logic configured to clock gate all or a portion of the storage elements corresponding to a data element in response to determining that all or a portion of that data element can be treated as having a zero value.

A second aspect provides a method of clock gating storage elements in a hardware unit for performing matrix multiplication, the hardware unit comprising a plurality of multipliers each configured to multiply data elements to output a multiplication data element, and a plurality of adders that form an adder tree to produce a sum of the multiplication data elements by adding data elements from a multiplier or an adder, wherein at least one multiplier and/or at least one adder is preceded by a storage element for each bit of each input data element, the method comprising; receiving information indicating whether each data element input to the at least one multiplier and/or the at least one adder can be treated as having a zero value, and/or, indicating whether a portion of each data element input to the at least one multiplier and/or the at least one adder can be treated as having a zero value; and in response to receiving information that indicates that a data element or portion of a data element can be treated as having a zero value, clock gating all or a portion of the storage elements corresponding to that data element.

A third aspect provides a hardware implementation of a Deep Neural Network "DNN" comprising the hardware unit of the first aspect configured to compute a convolution associated with one or more convolution layers and/or one or more fully-connected layers of the DNN.

The hardware unit for performing matrix multiplication may be embodied in hardware on an integrated circuit. There may be provided a method of manufacturing, at an integrated circuit manufacturing system, the hardware unit. There may be provided an integrated circuit definition dataset that, when processed in an integrated circuit manufacturing system, configures the system to manufacture the hardware unit for performing matrix multiplication. There may be provided a non-transitory computer readable storage medium having stored thereon a computer readable description of a hardware unit for performing matrix multiplication that, when processed in an integrated circuit manufacturing system, causes the integrated circuit manufacturing system to manufacture an integrated circuit embodying a hardware unit for performing matrix multiplication.

There may be provided an integrated circuit manufacturing system comprising: a non-transitory computer readable storage medium having stored thereon a computer readable description of the hardware unit for performing matrix multiplication; a layout processing system configured to process the computer readable description so as to generate a circuit layout description of an integrated circuit embodying the hardware unit for performing matrix multiplication; and an integrated circuit generation system configured to manufacture the hardware unit for performing matrix multiplication according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 5 is a table illustrating the calculation of the output element gate signal of FIG. 4;

FIG. 9 is a table illustrating an example of the storage element blocks preceding an adder that are not clocked for various bit widths;

Figure 1:
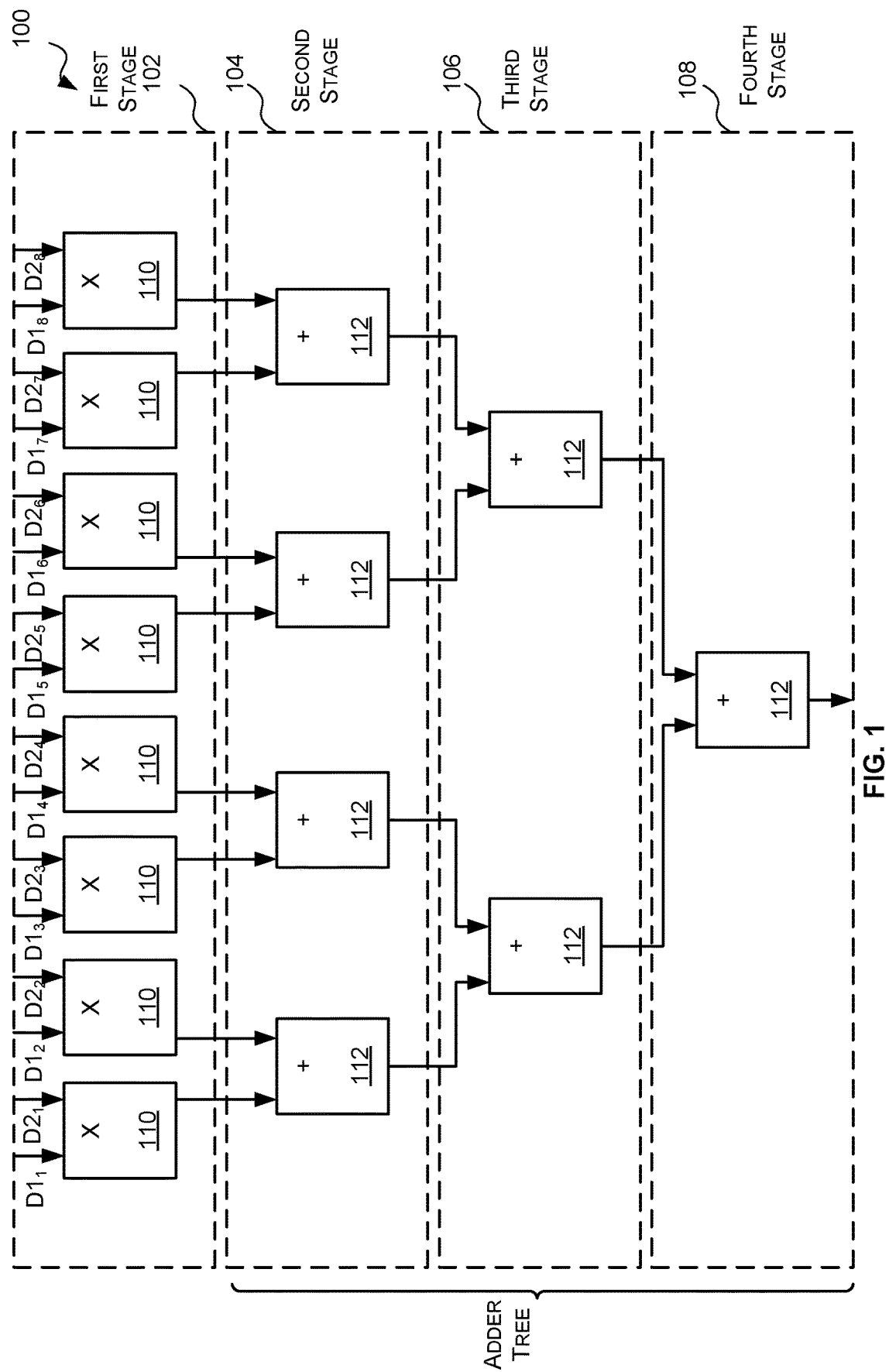
FIG. 1 is a block diagram of an example hardware unit for performing matrix multiplication.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Hardware to perform matrix multiplication may be implemented as a pipeline with a plurality of pipeline stages. For example, FIG. 1 illustrates an example hardware unit to perform matrix multiplication 100 wherein the matrix multiplication is performed via a plurality of pipeline stages 102, 104, 106, 108. The first stage 102, which may be referred to as a multiplier stage, comprises a plurality of parallel multipliers 110 which each multiply a first data element (D1) of a first set of data elements and a second data element (D2) of a second set of data elements to produce a multiplication data element. The first set of data elements (D1) may represent elements of one matrix (e.g. matrix A) and the second set of data elements (D2) may represent elements of another matrix (e.g. matrix B). The first and second data elements (D1, D2) may be stored in an external memory, such as a buffer, and provided to the first stage 102 via a communication channel established between the hardware unit 100 and the external memory. In the example of FIG. 1 the multiplier stage 102 comprises eight multipliers 110, however, it will be evident to a person of skill in the art that this is an example only and the multiplier stage 102 may have any number of multipliers greater than or equal to two. In some cases, the multiplier stage 102 may have 128 multipliers.

The remaining stages 104, 106, 108 form an adder tree to produce a sum of the multiplication data elements. Specifically, each of the remaining stages 104, 106, 108, which may be referred to as an adder stage, comprises one or more adders 112 configured to add at least two data elements generated by a previous stage to produce an addition data element. For example, each adder 112 of the second stage 104 is configured to add two multiplication data elements from the first stage 102 to produce an addition data element; each adder 112 of the third stage 106 is configured to add two addition data elements from the second stage 104 to produce an addition data element; and, each adder 112 of the fourth stage 108 is configured to add two addition data elements from the third stage 106 to produce the final output. In the example of FIG. 1, there are three adder stages 104, 106, 108, however, it will be evident to a person of skill in the art that this is an example only and other examples may have more or fewer adder stages. Generally, if the multiplier stage 102 comprises N multipliers 110 the adder tree comprises N−1 adders 112 over (N/2)−1 stages.

The hardware unit 100 of FIG. 1 computes the sum of the multiplications of the set of first data elements (D1) and the set of second data elements (D2). As such, the hardware unit 100 of FIG. 1 may be able to perform matrix multiplication over one or more hardware passes wherein a hardware pass comprises inputting a set of first data elements (D1) and set of second data elements (D2) and outputting the sum of the multiplications thereof. For example, depending on the number of multipliers 110 and the number of elements in the matrices there may be one hardware pass per element of the final matrix. In other cases, however, there may be more multiplications to generate an element of the final matrix then can be completed in a single hardware pass and thus it may take multiple hardware passes to generate an element of the final matrix. In these cases, output from the multiple hardware passes may be added together to generate an element of the final matrix.

For data to flow through the pipeline 102, 104, 106 and 108 in a predictable manner each arithmetic unit (e.g. multiplier 110 or adder 112) may be preceded by a set of storage elements for each data element input into the arithmetic unit 110 or 112. For example, in the example of FIG. 1 each arithmetic unit (e.g. multiplier 110 or adder 112) receives two data elements (a first data element (d1) and a second data element (d2)) that are processed by that arithmetic unit 110 or 112. The data elements received by the multipliers 110 are the original data elements input to the hardware unit 100 in a hardware pass, and the data elements received by the adders 112 are data elements generated by an earlier stage of the pipeline (e.g. output data elements of the multipliers 110 or output data elements of the adders 112 of an earlier stage of the pipeline).

Figure 2:
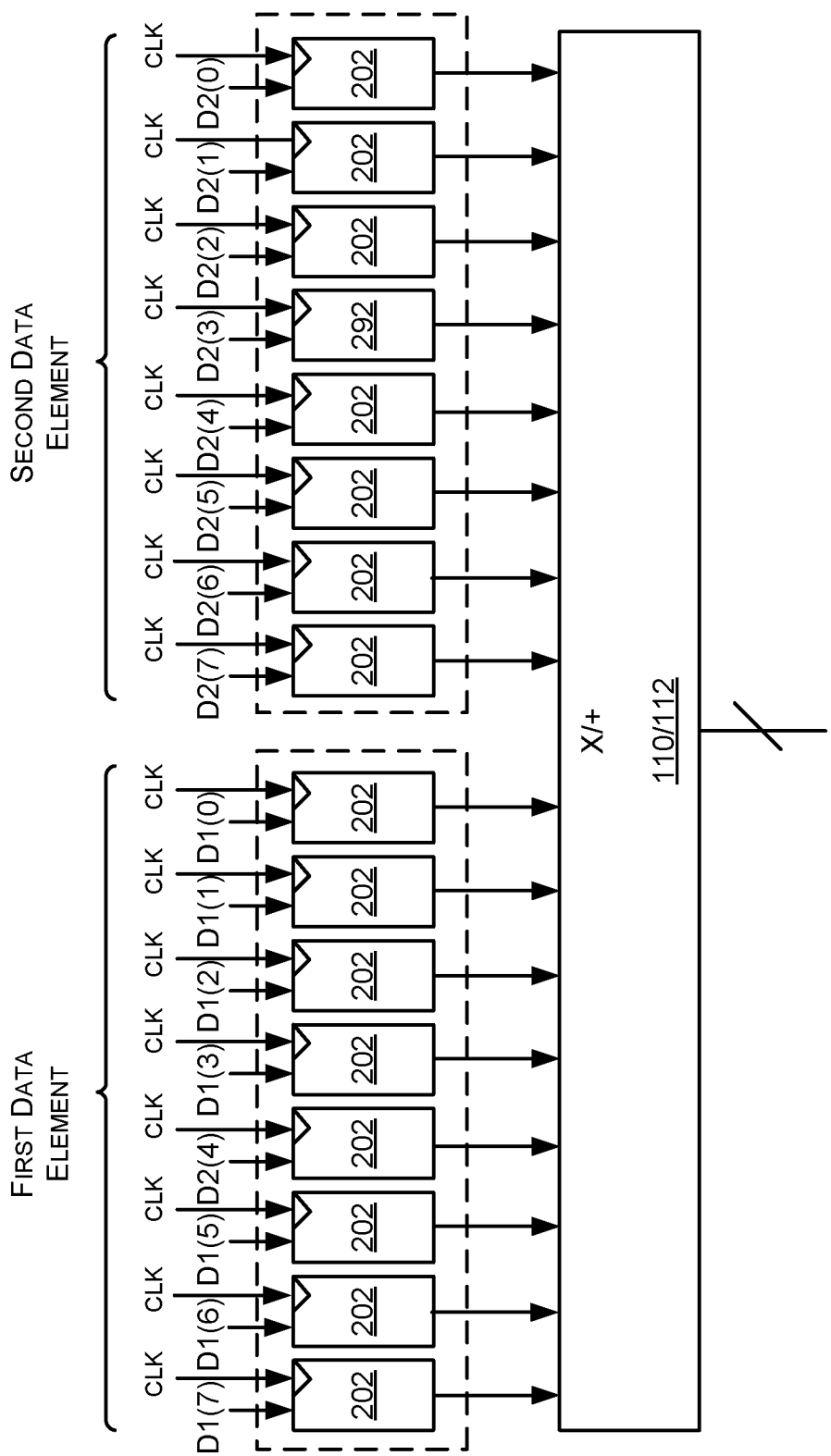
FIG. 2 is a block diagram of a set of storage elements preceding an arithmetic unit.

Reference is now made to FIG. 2 which illustrates an arithmetic unit (e.g. multiplier 110 or adder 112) preceded by a storage element 202 for each bit of the first and second data elements (D1, D2) input to the arithmetic unit (e.g. multiplier 110 or adder 112). The notation Dx(i) is used herein to refer to the $i^{th}$ bit of the $x^{th}$ data element. For example, D1(5) indicates the $5^{th}$ bit of the first (1) data element. The storage element receives the bit (from an external source in the case of multiplier, or from an earlier stage of the pipeline in the case of an adder) of the data element, stores the received bit, and outputs the stored bit to the corresponding arithmetic unit (e.g. multiplier 110 or adder 112). The storage elements 202 may be implemented as flip-flops, or any other form of register or memory cell.

As is known to those of skill in the art, storage elements 202 are 'clocked', meaning that a storage element is configured to update the stored value based on the input value at the transition of a clock signal (CLK). In other words, a storage element 202 ignores its input except at the transition of the clock signal (CLK). When a storage element 202 is clocked the storage element either changes or retains its stored value based upon the input value. Some storage elements are triggered on the rising edge of the clock signal (CLK), while other storage elements are triggered on the falling edge of the clock signal (CLK). As is known to those of skill in the art, each storage element consumes static power and dynamic power. Static power is the power that is consumed by the storage element when the storage element is in a steady state (i.e. the storage element is not switching or changing state). In contrast, dynamic power is the power that is consumed to invoke a state transition (i.e. power that is consumed when the storage element is switching or changing state). Typically, the static power is minor and the power consumed by a storage element is based on the dynamic power consumed by a storage element. Accordingly, the power consumed by a storage element can be reduced by reducing the number of state transitions.

In many matrix multiplications one or more data elements (or a portion thereof) may be known in advance to have a zero value (or can be treated as having a zero value). Instead of passing such data elements (or portions thereof) to the corresponding arithmetic unit via a set of storage elements the storage elements can be not be used (i.e. not clocked) for those data elements (or a portion thereof) and zero values can be directly supplied to the arithmetic unit. This can be achieved through a technique referred to as 'clock gating'. As is known to those of skill in the art, 'clock gating' is the technique wherein a circuit (e.g. a latch) is used to disable the clock controlling a circuit under certain conditions. By not 'clocking' a storage element when a bit is known to be zero (or can be treated as being zero) the number of state transitions for that storage element is reduced which reduces the power consumption of the storage element and the overall hardware unit.

Accordingly described herein are hardware units and methods for performing matrix multiplication via a plurality of pipeline stages wherein each stage is preceded by plurality of storage elements for storing data elements input to that stage and the storage elements associated with one or more stages of the pipeline are clock gated based on whether the data elements input to a stage, and/or portions thereof, have a zero value (or can be treated as having a zero value). In some cases, the storage elements may be clock gated on a per data element basis based on whether the data element has zero value (or can be treated as having a zero value). In other cases, the initial data elements may be represented in a fixed point number format comprising an exponent and a mantissa bit width and the mantissa bit width may vary between matrix multiplications or even between hardware passes of the same matrix multiplication. In these cases, the storage elements may be clock gated on a partial data element basis based on the mantissa bit widths of the initial data elements input into the hardware unit. For example, if the mantissa bit width of an initial data element is less than a maximum mantissa bit width then a portion of the bits related to that data element can be treated as having a zero value and a portion of the storage elements associated with that data element may not be clocked. In yet other cases the storage elements may be clock gated on both a per element and a partial element basis. This may reduce the power consumption of a hardware unit for performing matrix multiplication without significantly increasing the complexity of the hardware unit.

Figure 3:
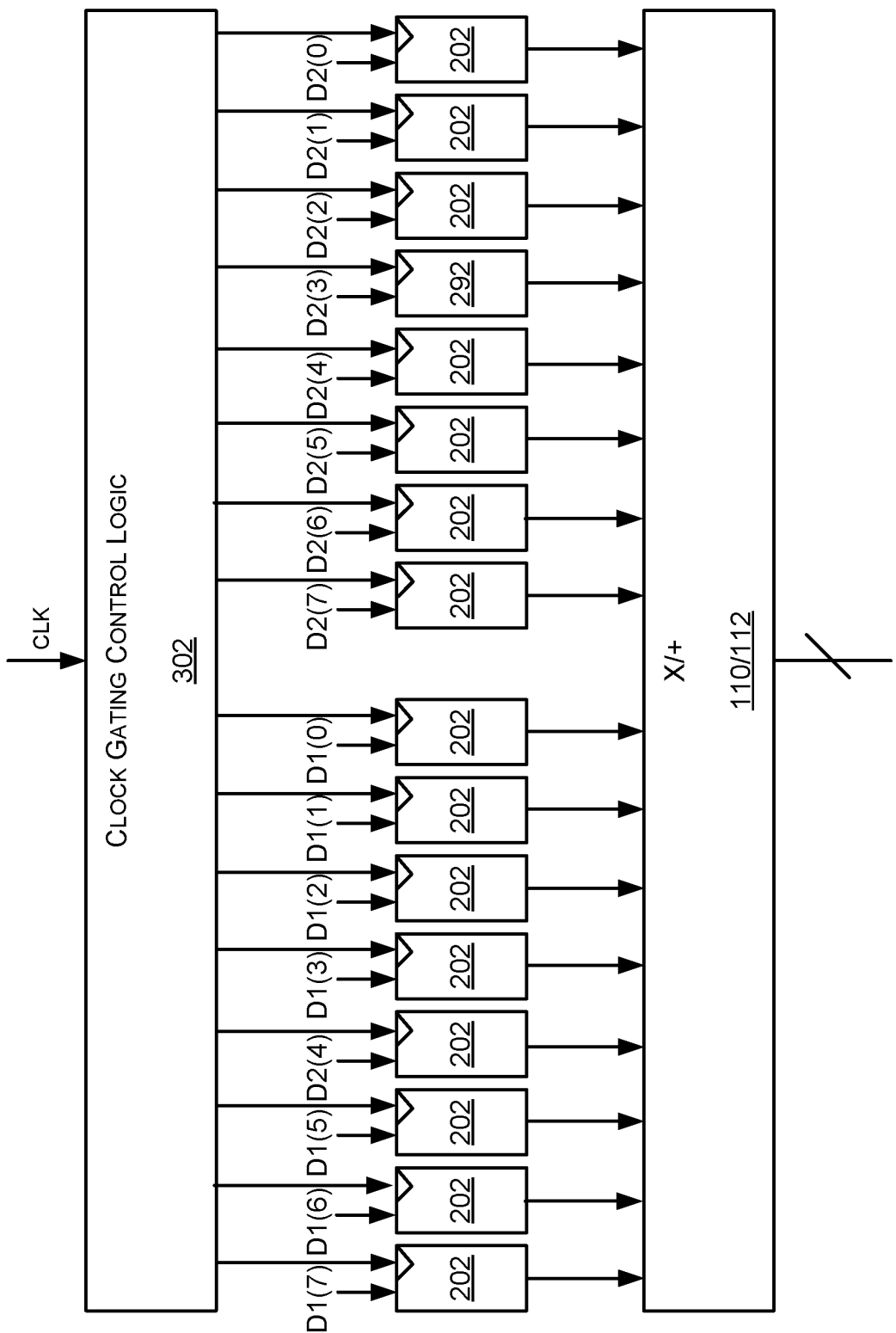
FIG. 3 is a block diagram of the storage elements and arithmetic unit of FIG. 2 with clock gating control logic.

Reference is now made to FIG. 3 which illustrates an example arithmetic unit (e.g. multiplier 110 or adder 112) which performs an arithmetic operation (e.g. multiplication or addition) on a first data element (D1) and a second data element (D2) wherein the first and second data elements (D1 and D2) are provided to the arithmetic unit via a set of storage elements 202. Specifically, there is one storage element for each bit of the first and second data elements (D1 and D2). However, unlike the storage element 202 and arithmetic unit 110/112 of FIG. 2 the clocking of the storage elements 202 is controlled by clock gating control logic 302. Specifically, the clock gating control logic 302 comprises hardware logic configured to clock gate (i.e. not clock) all or a portion of the storage elements corresponding to a data element in response to determining that all or a portion of the data element has a zero value (or can be treated as having a zero value).

In some cases, the clock gating control logic 302 may be configured to perform clock gating on a per data element basis. Clock gating on a per element basis means that all the storage elements that correspond to a particular data element are either clocked or not clocked together. In these cases, the clock gating control logic may be configured to clock gate the storage elements associated with a data element in response to determining that the data element can be treated as having a zero value. There may be many ways for determining that a value can be treated as having a zero value. For example, it may be determined that a data element can be treated as having a zero value if it is determined that the data element has a zero value; and/or if the data element is an input to a multiplier and the other data element input to the multiplier has a zero value. This is because anything multiplied by a zero value will produce a zero result and thus the data element can be treated as having a zero value.

In other cases, the clock gating control logic 302 may be configured to alternatively, or in addition, perform clock gating on a partial data element basis. Clock gating on a partial data element basis means that not all the storage elements that correspond to a particular data element must be clocked/not-clocked at the same time. Specifically, clock gating on a partial data element basis means that one or more of the storage elements associated with a data element may be clocked and one or more storage element associated with the same data element may not be clocked. For example, where the initial data elements can have a smaller bit width than the bit width supported by the hardware unit (e.g. the hardware unit supports 16-bit input data elements but the received data elements only have a bit width of 12) then not all the storage elements will receive valuable or useful information and thus some of the storage elements can be treated as having a zero value. Accordingly, the clock gating control logic 302 may be configured to clock gate one or more of the storage elements associated with a data element based on the bit width of the initial data elements.

Example implementations of the clock gating control logic 302 of FIG. 3 are described below with respect to FIGS. 4, 6 and 10. Although FIG. 3 shows clock gating control logic for controlling the clocking of storage elements preceding a single arithmetic unit (e.g. multiplier 110 or adder 112) the clock gating control logic may be replicated for each arithmetic unit of the same layer and/or for arithmetic units of all or portion of other layers.

Figure 4:
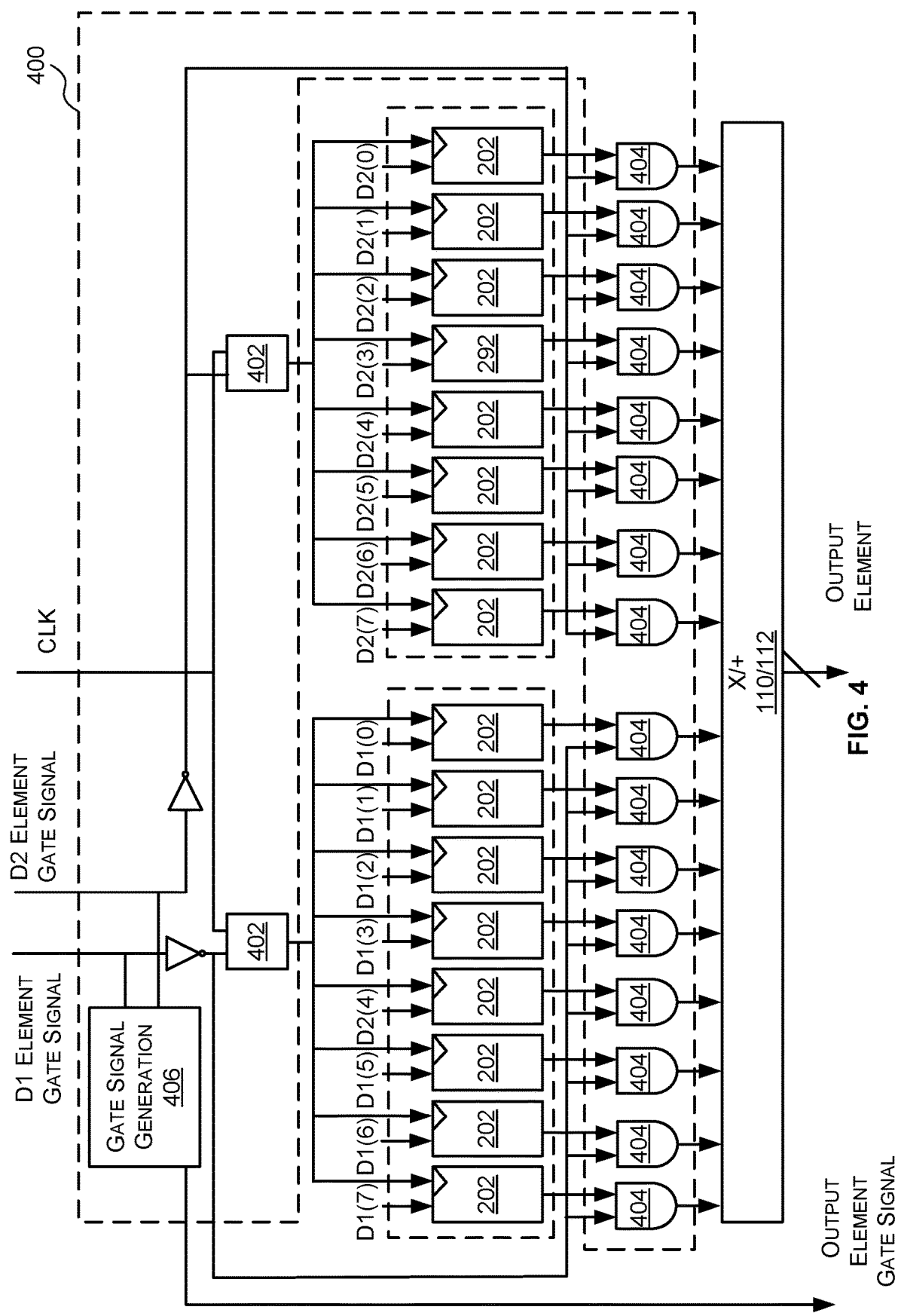
FIG. 4 is a block diagram of a first example implementation of the clock gating control logic of FIG. 3.

Reference is now made to FIG. 4 which illustrates a first example implementation of clock gating control logic 400 which may be used as the clock gating control logic 302 of FIG. 3. In this example, the clock gating control logic 400 is configured to clock gate the storage elements 202 preceding a particular arithmetic unit (e.g. multiplier 110 or adder 112) on a per data element basis based on the sparsity of the data elements. Although FIG. 4 shows clock gating control logic for controlling storage elements 202 preceding a single arithmetic unit (e.g. multiplier 110 or adder 112) the clock gating control logic may be replicated for each arithmetic unit of the same layer and/or for arithmetic units of all or portion of other layers.

The clock gating control logic 400 of FIG. 4 comprises gating logic units 402, AND gates 404, and gate signal generation logic 406. The clock gating control logic 400 receives an element gate signal, for each data element to be processed by the arithmetic unit 110 or 112, that indicates whether that data element can be treated has having a zero value and thus should be clock gated (i.e. not clocked). For example, as shown in FIG. 4, where there are two data elements (D1 and D2) the clock gating control logic 400 receives a first element gate signal for the first data element D1 that indicates whether the first data element D1 can be treated as having a zero value and thus should be gated; and a second element gate signal for the second data element D2 that indicates whether the second data element D2 can be treated as having a zero value and should be gated or not. In some cases, an element gate signal may have a value of '1' if the corresponding data element is to be clock gated (i.e. not clocked) and may have a value of '0' if the corresponding data element is not to be clock gated (i.e. clocked).

Where the clock gating control logic 400 is configured to control the storage elements preceding a multiplier 110, the element gate signals may be generated by logic external (not shown) to the hardware unit or by a logic internal to the hardware unit. The external or internal logic may be configured to, set the element gate signals of both data elements to indicate that the corresponding data element can be treated as having a zero value and should be gated if either of the data elements has a zero value (or if either of the data elements can be treated as having a zero value). This is because if either of the input data elements of a multiplication are zero (or can be treated as zero) then the output of the multiplication will be zero and thus the multiplication does not need to be performed. This means that both data elements can be gated (i.e. not clocked). The external or internal logic may determine that a data element can be treated as having a zero value based on one or more criteria. For example, where the hardware unit is being used to perform a convolution for a layer of a deep neural network the internal or external logic may be configured to determine a data element can be treated as having a zero value if the data element is an input data value and the input data value lies in a plane that is outside the layer, or if the data element is a weight and the weight lies outside of the current window. It will be evident to a person of skill in the art that this is an example only and that the external or internal logic may be configured to determine that a data element may be treated as having a zero value based on one or more additional or alternative criteria.

In contrast, where the clock gating control logic 400 is configured to control the storage elements preceding an adder 112 the element gate signals indicating whether the corresponding data elements can be treated as having a zero value and thus should be clock gated (i.e. not clocked) may be generated by the clock gating control logic 400 of the preceding stage. Specifically, as described in more detail below, the gate signal generation logic 406 may be configured to generate an output element gate signal which indicates whether the output element generated by the arithmetic unit 110 or 112 should be gated in the subsequent pipeline stage or not.

There is a gating logic unit 402 for each group of storage elements 202 that are controlled by the same clock signal. For example, in FIG. 4 all the storage elements associated with each data element are controlled by a single clock signal thus there are only two gating logic units 402, one for the storage elements associated with the first data element (D1) and one for the storage elements associated with the second data element (D2). It will be evident to the person of skill in the art that this is an example only and that the storage elements associated with a data element may be grouped in a different manner. For example, in other cases the storage elements of each data element may be divided into groups of four storage elements. In this case there would be four gating logic units, one for each group of four storage elements.

Each gating logic unit 402 is configured to receive an input clock signal (CLK) and the corresponding element gate signal (after being passed through a NOT gate if the element gate signals are set to '1' to indicate that the corresponding data element is to be clock gated) and provide an output clock signal to the clock input of each corresponding storage element which causes the storage element to be clocked when the element gate signal indicates that the corresponding data element is to be clocked and causes the storage element not to be clocked when the element gate signal indicates that the corresponding data element is not to be clocked. In other words, the gating logic unit 402 effectively generates the output clock signal by performing an AND operation on the input clock signal (CLK) and the corresponding element gate signal. For example, as shown in FIG. 4, the gating logic unit 402 that controls the storage elements for the first data element is configured to generate an output clock signal that causes the storage elements for the first data element to be clocked when the NOT'd D1 element gate signal is a '1' and causes the storage elements for the first data element to not be clocked when the NOT'd D1 element gate signal is a '0'; and the gating logic unit 402 that controls the storage elements for the second data element is configured to generate an output clock signal that causes the storage elements for the second data element to be clocked when the NOT'd D2 element gate signal is a '1' and causes the storage elements for the second data element to not be clocked when the NOT'd D2 element gate signal is a '0'.

Each gating logic unit 402 may be implemented using an AND gate, gated latch or any other logically equivalent circuit. Furthermore, even though the gating logic unit 402 is shown as being external to the storage elements 202, in other cases the gating logic units 402 may be implemented within the storage elements 202. For example, in some cases the storage elements may be implemented using gated flip-flops which are configured to receive the input clock signal and the corresponding element gate signal and only clock the flip-flop when both the input clock signal and the element gate signal are high (i.e. are a '1').

There is an AND gate 404 for each storage element of the first and second data elements (D1 and D2). For example, as shown in FIG. 4, where each data element (D1 and D2) can be up to 8 bits in length there are 16 AND gates, one for each of bit of the first and second data elements (D1 and D2).

Each AND gate 404 is configured to perform an AND operation on the output of a storage element and the corresponding element gate signal (after being passed through a NOT gate if the element gate signals are set to '1' to indicate that the corresponding data is to be clock gated) and the output of the AND operation is provided to the arithmetic unit 110 or 112. This forces the clock gated bits to zero. Accordingly, in the example of FIG. 4 if it is determined that a data element has a zero value (or can be treated as having a zero value), instead of clocking the bits of that data element through the storage elements to the arithmetic unit the storage elements are clock gated (i.e. not clocked) and zeros are provided to the arithmetic unit.

The gate signal generation logic 406 is configured to propagate the element gate information to the next stage of the pipeline. Specifically, the gate signal generation logic 406 is configured to determine, based on the element gate signals for the data elements input to the arithmetic unit, whether the output data element of the arithmetic unit can be treated as having a zero value and thus clock gated; and generate an output element gate signal indicating whether the output element can be treated as having a zero value and thus is to be gated. The output gate element signal is then provided to the clock gating control logic of the next stage in the pipeline.

In some cases, the determination of whether the output element should be gated may be based on the type of arithmetic operation being performed by the arithmetic unit. For example, where the arithmetic unit is a multiplier the output data element will have a zero value (and thus can be clock gated) if either of the input data elements are have a zero value (or can be treated as having a zero value) since zero multiplied with anything is zero. Accordingly, the gate signal generation logic 406 may be configured to determine the output element of a multiplier can be treated as having a zero value, and thus can be clock gated, if either of the input data elements to the multiplier can be treated as having a zero value. Where, as described above, the initial element gate signals received by the clock gating control logic 400 are configured to indicate both data elements can be treated as having a zero value when at least one of the data elements has a zero value (or can be treated as having a zero value) then both initial element gate signals will be the same—i.e. they will either both indicate that the corresponding data element can be treated as having a zero value and thus can be clock gated or they will both indicate that the corresponding data element cannot be treated as having a zero value and thus cannot be clock gated. In these cases, the output element gate signal can be set to either of the initial element gate signals. Accordingly, the gate signal generation logic 406 for the first stage may be configured to simply output either of the initial element gate signals as the output element gate signal.

In contrast, where the arithmetic unit is an adder the output data element will only have a zero value (and thus can be clock gated) if all the input data elements have a zero value, or can be treated as having a zero value, since only the sum of zeros is equal to zero. Accordingly, as shown in the table of FIG. 5 the gate signal generation logic 406 may be configured to indicate the output element of an adder can be treated as having a zero value, and thus can be clock gated, if all the input data elements can be treated as having a zero value; and indicate the output element of a multiplier can be treated as having a zero value, and thus can be clock gated, if any of the input data elements can be treated as having a zero value.

Figure 6:
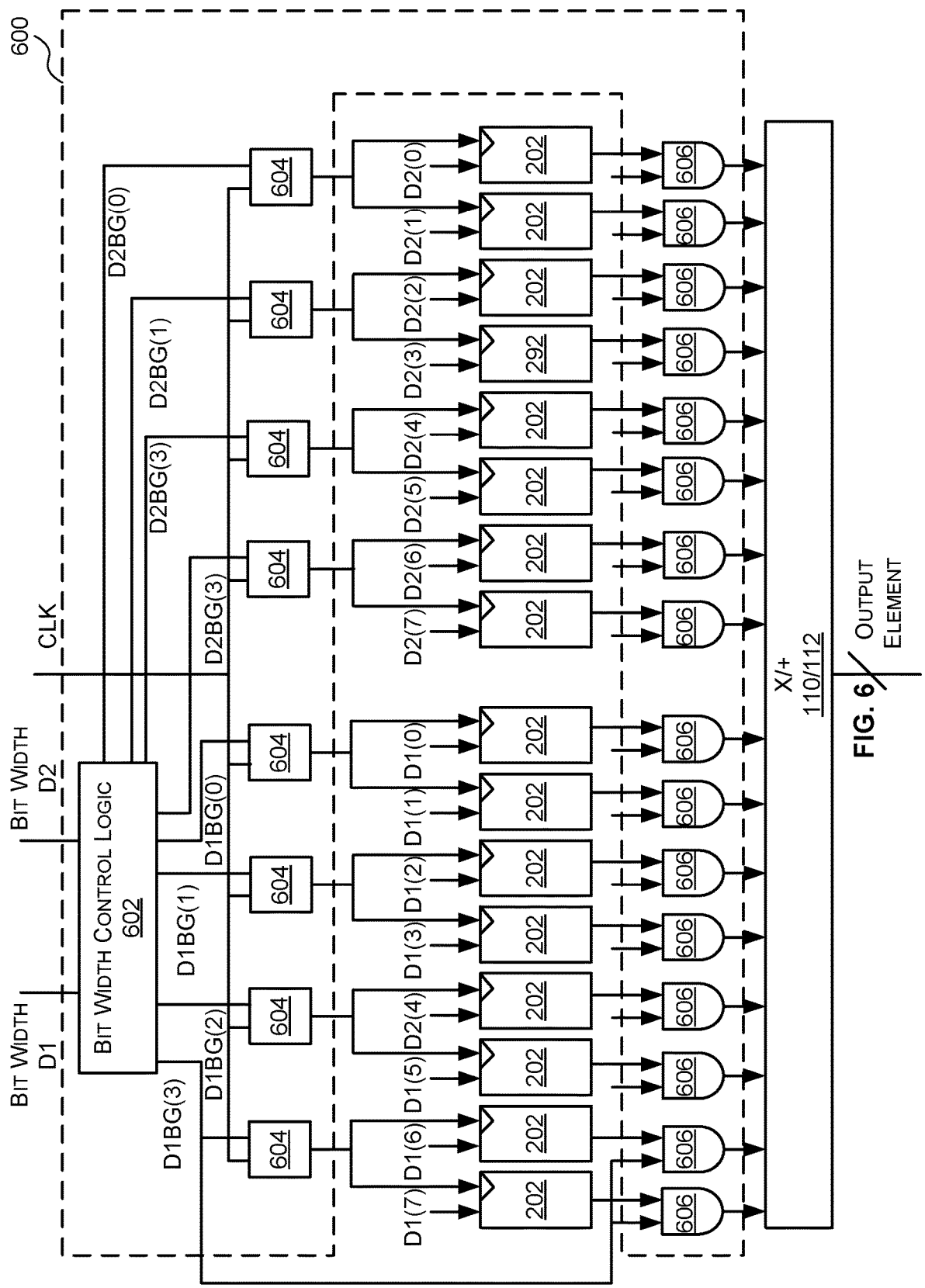
FIG. 6 is a block diagram of a second example implementation of the clock gating control logic of FIG. 3.

Reference is now made to FIG. 6 which illustrates a second example implementation of clock gating control logic 600 which may be used as the clock gating control logic 302 of FIG. 3. In this example, the clock gating control logic 600 is configured to clock gate the storage elements preceding a particular arithmetic unit (e.g. multiplier 110 or adder 112) on a partial data element basis based on the bit widths of the initial sets of data elements. Although FIG. 6 shows clock gating control logic for controlling storage elements preceding a single arithmetic unit (e.g. multiplier 110 or adder 112) the clock gating control logic may be replicated for each arithmetic unit of the same layer and/or for arithmetic units of all or portion of other layers.

In this example, the hardware unit 100 is configured to receive and process data elements comprising a maximum number of bits, however the initial data elements that are input may use less bits than the maximum number of bits. For example, the hardware unit 100 may be configured to receive and process 16-bit data elements, however one of the initial sets of data elements may only comprise 4-bit data elements meaning that the data elements of that set only comprise 4-bits of relevant information. As a result, 12 bits of the data elements of that set are not used (and thus can be treated as having a zero value) and thus can be clock gated. Also the different sets of data elements may use a different number of bits which reflect the range of values in the set.

For example, the first set of data elements (D1) may have a different bit width than the second set of data elements (D2). Accordingly, in these examples, in addition to receiving the first and second sets of data elements as input to the hardware unit 100, the hardware unit 100 also receives information indicating the number of bits used for the first set of data elements and the number of bits used for the second set of data elements which may be referred to herein as the mantissa bit length, bit width or bit depth. The clock gating control logic 600 is then configured to determine which bits of the data elements may be clock gated based on the bit widths of the first and second sets of data elements.

The example clock gating control logic 600 of FIG. 6 comprises bit width control logic 602, gating logic units 604, and AND gates 606. The bit width control logic 602 is configured to receive the bit widths of the first and second sets of data elements; in response to determining at least one of the bit widths is less than the maximum bit width, determine, based on the bit widths and the stage of the pipeline which bits of the first and second data elements are to be clock gated (i.e. not clocked); and output a set of block gate signals for each data element indicating which blocks of the data elements are to be clock gated (i.e. not clocked) and which blocks of the data elements are not to be clock gated (i.e. clocked).

Specifically, the storage elements 202 of each data element are divided into a plurality of groups or blocks which can be independently clock gated or clocked. For example, in FIG. 2 the eight storage elements of each data element (D1 and D2) are divided into groups or blocks of two bits/two storage elements each. However, it will be evident to a person of skill in the art this is an example only and the storage elements may be divided into blocks in a different manner. For example, in other cases the storage elements of each data element may be divided into groups or blocks of four-bits/four storage elements.

The bit width control logic 602 is configured to determine, based on the bit width of the first and second sets of data elements and the stage of the pipeline, the blocks of the data elements that can be clock gated. Generally, those bits that are known to have a zero value (or can be treated as having a zero value) can be clock gated.

The bits of the data elements input to a multiplier that have a zero value (or can be treated as having a zero value) can be determined from the bit width of the corresponding set of data elements and the format of the data elements. For example, the bits of the first data element input to a multiplier that can be treated as having a zero value is determined from the bit width of the first set of data elements; and the bits of the second data element input to a multiplier that can be treated as having a zero value is based on the bit width of the second set of data elements. Generally, if the bit width of a set of data elements is less than the maximum bit width then at least a portion of the bits of those data element can be treated as having a zero value and thus can be clock gated. Specifically, the number of bits of a data element input to a multiplier that are zero (or can be treated as having a zero value) is the difference between the maximum bit width and the bit width of the corresponding set of data elements as shown in equation (2), as the remaining bits can be considered to contain valuable information:

$$NumZeroBits = MaxNumBit - BitLength \qquad (2)$$

Where the storage elements are divided into a number of groups or blocks of size X then the number of blocks that are clock gated may be expressed as NumZeroBits divided by the size of the blocks as shown in equation (3):

$$NumZeroBlocks = \frac{NumZeroBits}{x} \qquad (3)$$

In some cases, where the storage elements are divided into a number of groups or blocks of size X the BitLength may be expressed as a multiple of X. Specifically, the BitLength may be rounded up to the nearest integer multiple of X.

The specific bits/blocks that are zero (or can be treated as having a zero value) will be based on the format of the data elements. For example, if a least significant bit (LSB) aligned format is used for an unsigned binary number then the bits that contain the valuable information will be in the least significant bit positions. For example, if the maximum number of bits is sixteen and a data element uses a bit width of eight then there will be eight bits that contain valuable information and they will be located in the eight least significant bits (i.e. bits 7 to 0). In these cases, the specific bit/blocks that have a zero value (or can be treated as having a zero value) may be the most significant NumZeroBits or the most significant NumZero Blocks. In contrast, if a most significant bit (MSB) aligned format is used then the bits that contain the valuable information will be located in the most significant bit positions. For example, if the maximum number of bits is sixteen and the data element uses a bit-depth of eight then there will be eight bits that contain valuable information and they will be located in the eight most significant bits (i.e. bits 15-8). In these cases the bits of the data elements that are not clocked may be the first eight bits or the last eight bits respectively.

Figure 7:
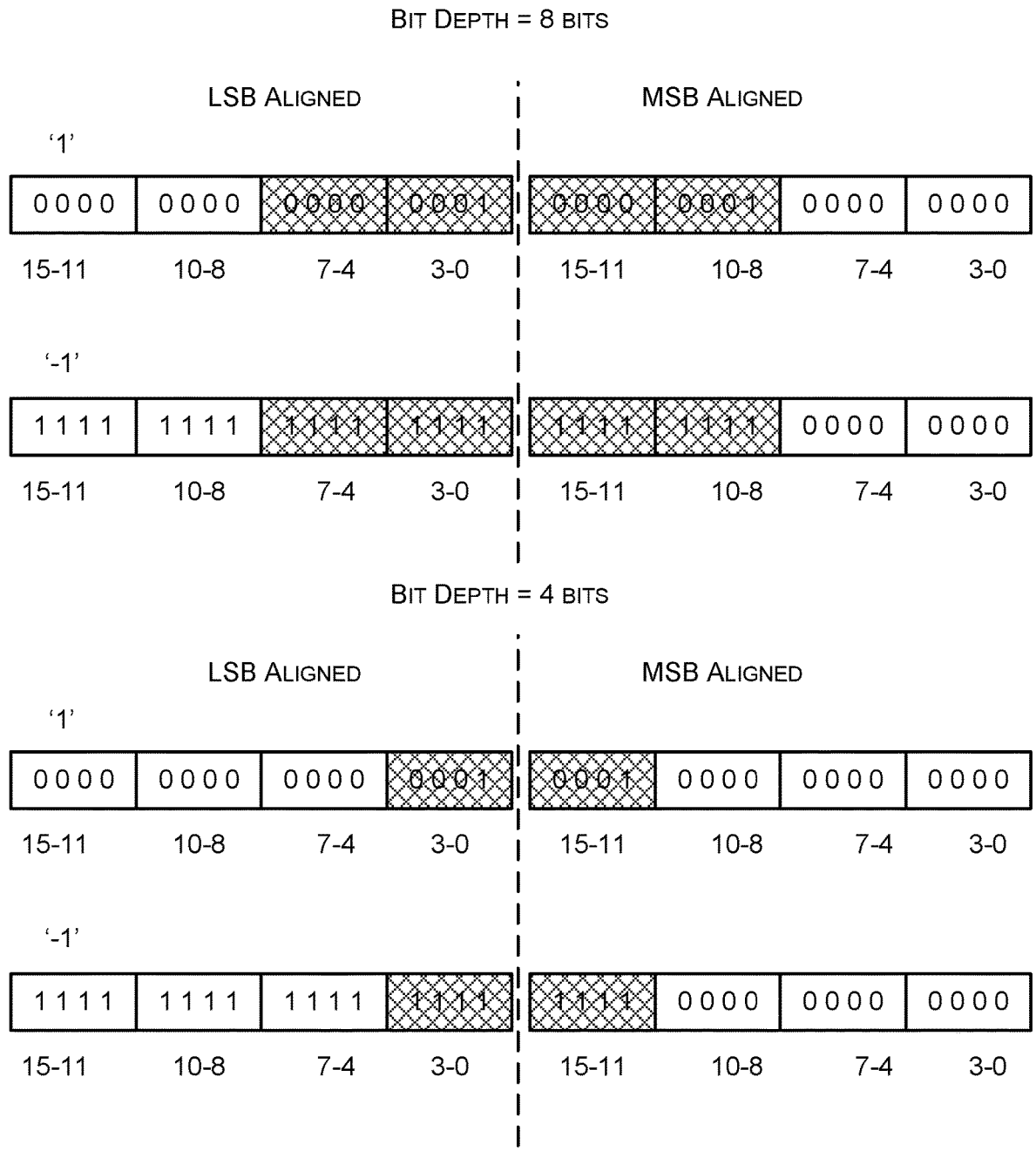
FIG. 7 is a schematic diagram illustrating most significant bit aligned two's complement format.

If, however the LSB aligned format is used for a signed binary number in two's complement format the identification of the bits/blocks that can be treated as having a zero value and thus can be clock gated may vary between positive numbers and negative numbers. This is because for a negative number in two's complement format that is LSB-aligned the sign bit is extended over the unused bits the so that they include a '1' as opposed to a zero. This means that bits of negative numbers cannot be clock gated as there are not bits that are guaranteed to be zero or that can be treated as being zero. This problem can be avoided and the number of clock gated bits may be increased if a MSB aligned format is used for signed binary numbers in two's complement format. This is because, as shown in FIG. 7 the sign bit does not have to be extended to the unused bits in this format since the unused bits are in the least significant bit positions. Accordingly, if the data elements are signed numbers in two's complement format it may be advantageous to use a MSB-aligned format. In such cases, the least significant NumZeroBits of according to equation (2) or the least significant NumZeroBlocks according to equation (3) can be easily identified as the bits/blocks which can be clock gated for both negative and positive numbers.

Figure 8:
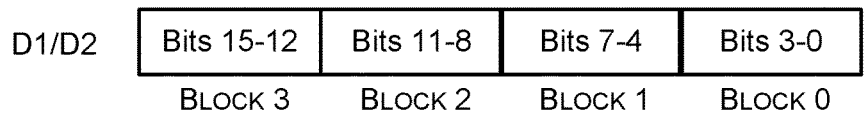
FIG. 8 is a table illustrating an example of the storage element blocks preceding a multiplier that are not clocked for various bit widths.

FIG. 8 is a table showing which groups or blocks of storage elements 202 of the first and second data elements of the first stage of the pipeline may be clock gated (e.g. not clocked) for each of a plurality of different bit width combinations for the first and second sets of data elements based on equation (3) wherein the maximum bit width is sixteen, the storage elements of a data element are divided into groups or blocks of four, and the data elements are MSB aligned. In this example the possible bit widths are {4, 8, 12 and 16} which results in one of {0, 4, 8, 12} bits of each data element not being clock gated.

The bits of the data elements input to an adder that have a zero value (or can be treated as having a zero value) and thus can be clock gated may be determined from the bit widths of the original data elements, but in a different manner. In the first stage of the pipeline (i.e. the multiplier stage) first data elements are multiplied by second data elements which produces a number of multiplication outputs. As is known to those of skill in the art, multiplying an x bit number with a y bit number produces an x+y bit number. Accordingly, if the x bit number has a bits that can be treated as having a zero value and the y bit number has b bits that can be treated as having a zero value then the total number of bits that can be treated as having a zero value is a+b. The number of clock gated bits will not increase or decrease over subsequent additions thus the number of bits that can be clock gated is the same for each adder regardless of the stage of the adder. If the MSB-aligned format is used the bits of the data elements input to an adder that can be treated as having a zero value, and thus can be clock gated, will be the least significant a+b bits of the data elements. Where the storage elements are divided into blocks or groups of size N and a MSB-aligned format is used the blocks that can be treated as having a zero value, and thus can be clock gated, will be the least significant (a+b)/N.

FIG. 9 is a table showing which blocks of storage elements 202 of the first and second data elements input to an adder can be treated as having a zero value, and thus can be clock gated (e.g. not clocked), for each of a plurality of different bit width combinations for the initial first and second data sets wherein the maximum bit width is sixteen, the storage elements of a data element are divided into groups or blocks of four, and the data elements are MSB aligned. Accordingly, in this example the possible bit widths are {4, 8, 12 and 16} which results in one of {0, 4, 8, 12, 16, 20, 24} bits of each data element being clock gated.

Once the bit width control logic 602 has determined which bits/storage elements or which blocks of bits/storage elements of the data elements can be treated as having a zero value and thus can be clock gated, the bit width control logic 602 is configured to output a block gate signal for each block of storage elements which indicates whether the storage elements of that block or group can be treated as having a zero value and thus are to be clock gated. For example, in FIG. 6 where the storage elements are divided into blocks of two storage elements the bit width control logic 602 is configured to generate a control signal for each block of storage elements where the blocks are numbered 0 to 3. Specifically, the bit width control logic 602 generates eight block gate control signals—a data element 1 block gate control signal (3) for block 3 (D1BG(3)), a data element 1 block gate control signal (2) for block 2 (D1BG(2)), data element 1 block gate control signal (1) for block 1 (D1BG (1)), data element 1 block gate control signal (0) for block 0 (D1BG(0)), a data element 2 block gate control signal (3) for block 3 (D2BG(3)), a data element 2 block gate control signal (2) for block 2 (D2BG(2)), data element 2 block gate control signal (1) for block 1 (D1BG(1)), and data element 2 block gate control signal (0) for block 0 ((D1BG(0)). The control signals are then provided to the corresponding gating logic units 604 and AND gates 606. Only some of the connections between the control signals and the AND gates 606 are shown in FIG. 6 for simplicity.

There is a gating logic unit 604 for each block or group of storage elements associated with the data elements. For example, in FIG. 6 the storage elements associated with each data element are grouped into blocks of two storage elements thus there are four gating logic units 604 for each data element. It will be evident to the person of skill in the art that this is an example only and that the storage elements associated with a data element may be grouped in a different manner.

Each gating logic unit 604 is configured to receive an input clock signal (CLK) and the corresponding block gate control signal and provide an output clock signal to the clock input of each corresponding storage element which causes the storage element to be clocked when the block gate signal indicates that the corresponding block is to be clocked and causes the storage element not to be clocked when the block gate signal indicates that the corresponding block is not to be clocked. In other words, the gating logic unit 604 effectively generates the output clock signal by performing an AND operation on the input clock signal (CLK) and the corresponding block gate signal. For example, as shown in FIG. 6, the gating logic unit 604 that controls the storage elements for the two most significant bits of the first data element is configured to generate an output clock signal that causes the storage elements for the two most significant bits of the first data element to be clocked when the D1 block 3 gate signal (D1BG(3)) is a '1' and causes the storage elements for the two most significant bits of the first data element to not be clocked when the D1 block 3 gate signal (D1BG(3)) is a '0'; and the gating logic unit 604 that controls the storage elements for the two least significant bits of the first data element is configured to generate an output clock signal that causes the storage elements for the two least significant bits of the first data element to be clocked when the D1 block 0 gate signal (D1BG(0)) is a '1' and causes the storage elements for the two least significant bits of the first data element to not be clocked when the D1 block 0 gate signal (D1BG(0)) is a '0'.

Each gating logic unit 604 may be implemented using an AND gate, gated latch or any other logically equivalent circuit. Furthermore, even though the gating logic unit 604 is shown as being external to the storage elements 202, in other cases the gating logic units 604 may be implemented within the storage elements 202. For example, in some cases the storage elements may be implemented using gated flip-flops which are configured to receive the input clock signal and the corresponding block gate signal and only clock the flip-flop when both the input clock signal and the block gate signal are high (i.e. are a '1').

There is an AND gate 606 for each storage element of the first and second data elements (D1 and D2). For example, as shown in FIG. 6, where each data element (D1 and D2) can be up to 8 bits in length the set of AND gates 606 comprises 16 AND gates, one for each of bit of the first and second elements (D1 and D2).

Each AND gate 606 is configured to perform an AND operation on the output of a storage element and the corresponding block gate signal, and provide the output of the AND operation to the arithmetic unit 110 or 112. This forces the clock gated bits to zero. Accordingly, in the example of FIG. 6 if it is determined, in advance that a number of bits of the data elements are not used and thus can be treated as having a zero value, instead of clocking those bits through the storage elements to the arithmetic unit the storage elements for those bits are clock gated and zeros are provided to the arithmetic unit.

Figure 10:
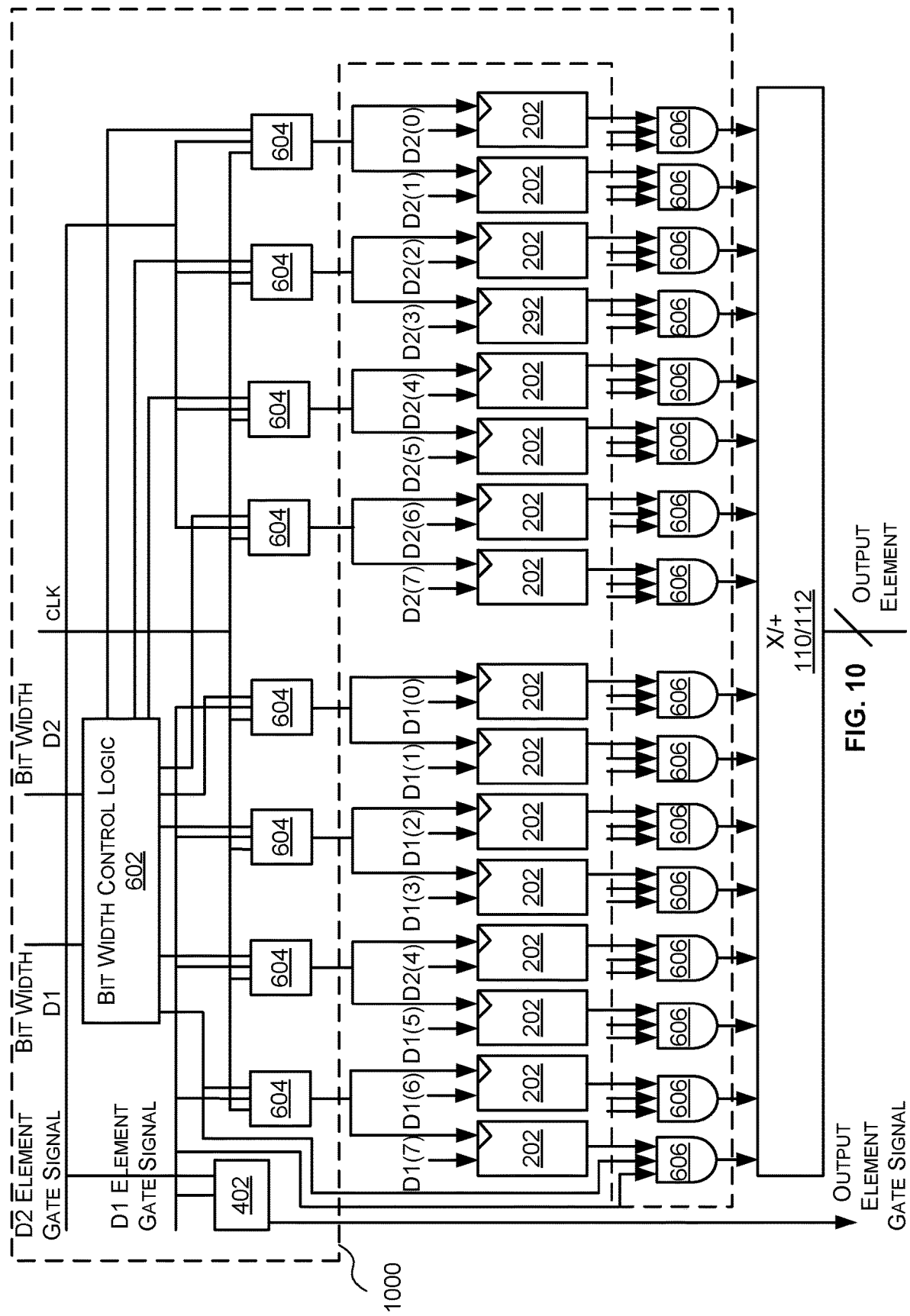
FIG. 10 is a block diagram of a third example implementation of the clock gating control logic of FIG. 3.

Reference is now made to FIG. 10 which illustrates a third example implementation of clock gating control logic 1000 which may be used as the clock gating control logic 302 of FIG. 3. The clock gating control logic 1000 is a combination of the clock gating control logics 400 and 600 of FIGS. 4 and 6 and is configured to perform both per data element clock gating and partial data element clock gating. Specifically, the clock gating control logic 1000 of FIG. 10 comprises the bit width control logic 602 of FIG. 6 which generates a block gate signal for each block of storage elements of the data elements based on the bit width of the initial sets of data elements which are provided to the corresponding gating logic unit 604 to cause the storage elements of the corresponding block to be clock gated when the block gate signal indicates so; and to the corresponding AND gates 606 to force a zero to be fed to the arithmetic logic when the corresponding storage element is clock gated. In addition, the clock gating control logic 1000 receives the D1 and D2 element gate signals of FIG. 4. The D1 element gate signal is input to the gating logic unit 604 corresponding to the first data element and to the AND gates 606 corresponding to the first data element (only some of the connections between the gate signals and the AND gates 606 are shown in FIG. 10 for simplicity); and the D2 element gate signal is input to the gating logic units 604 corresponding to the second data element respectively. In this way the storage elements of a block are clock gated (i.e. not clocked) if either the whole data element is to be clock gated (based on the element gate control signal for the data element) or the block of the data element is clock gated (based on the block gate signal for that block); and a zero is provided to the arithmetic unit 110 or 112 if the corresponding storage element is clock gated (i.e. not clocked).

The hardware units 100 for performing matrix multiplication described herein may be used in a hardware implementation of a neural network. For example, the hardware units for performing matrix multiplication may be used in a hardware implementation of a neural network to compute the convolution associated with one or more convolution layers and/or one or more fully-connected layers.

Figure 11:
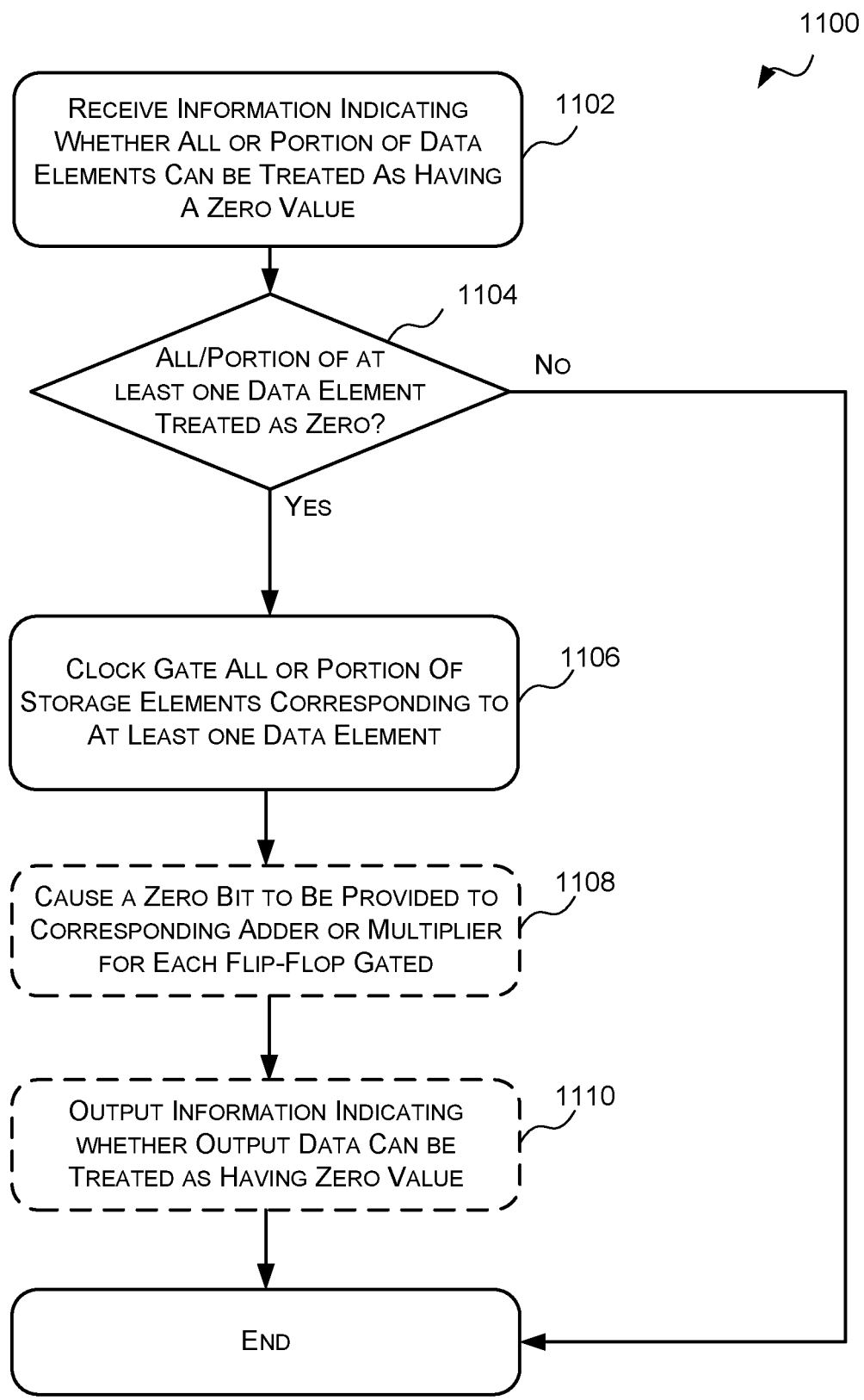
FIG. 11 is a flow diagram of an example method for clock gating the storage elements of the hardware unit of FIG. 1.
Figure 12:
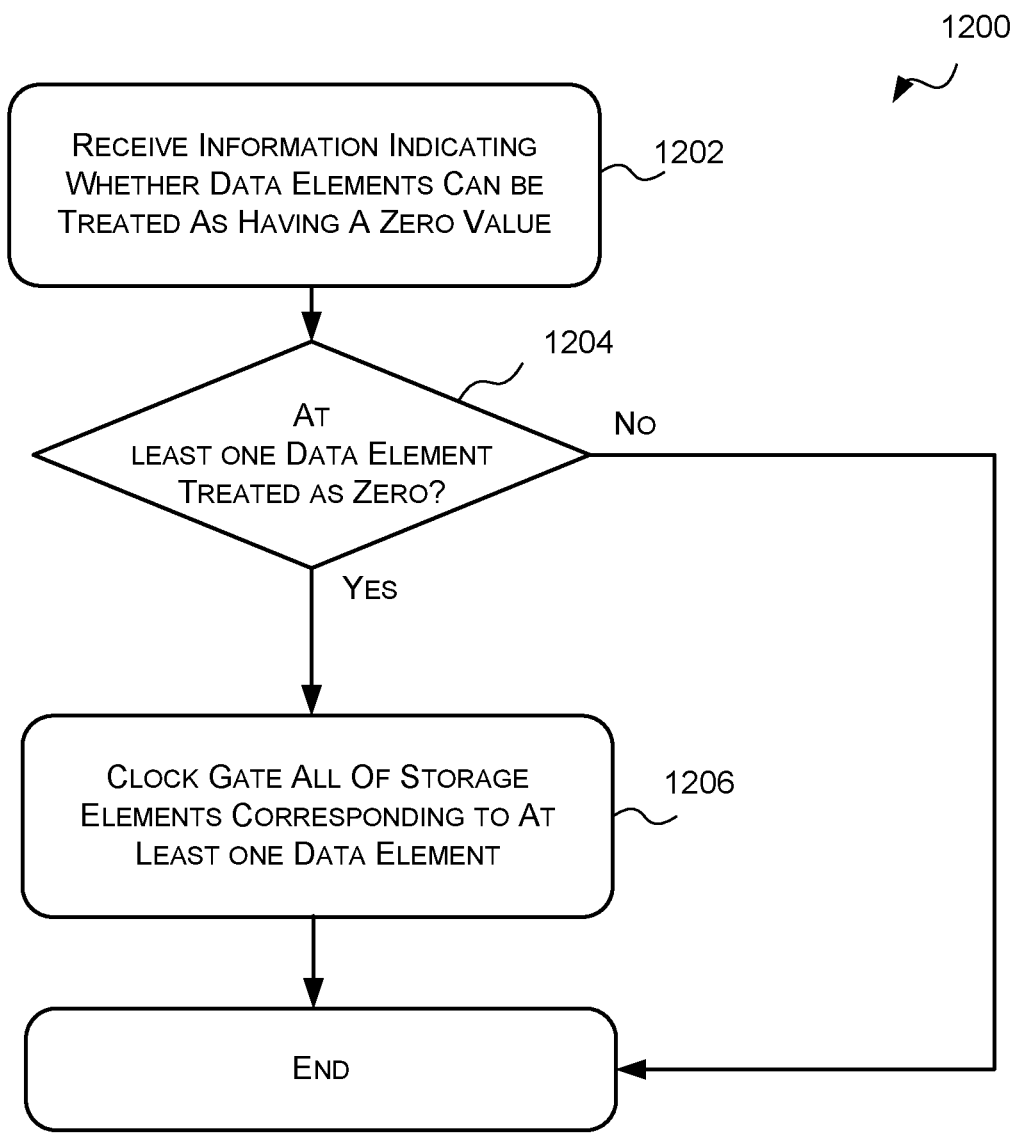
FIG. 12 is a flow diagram of a first example implementation of the method of FIG. 11.
Figure 13:
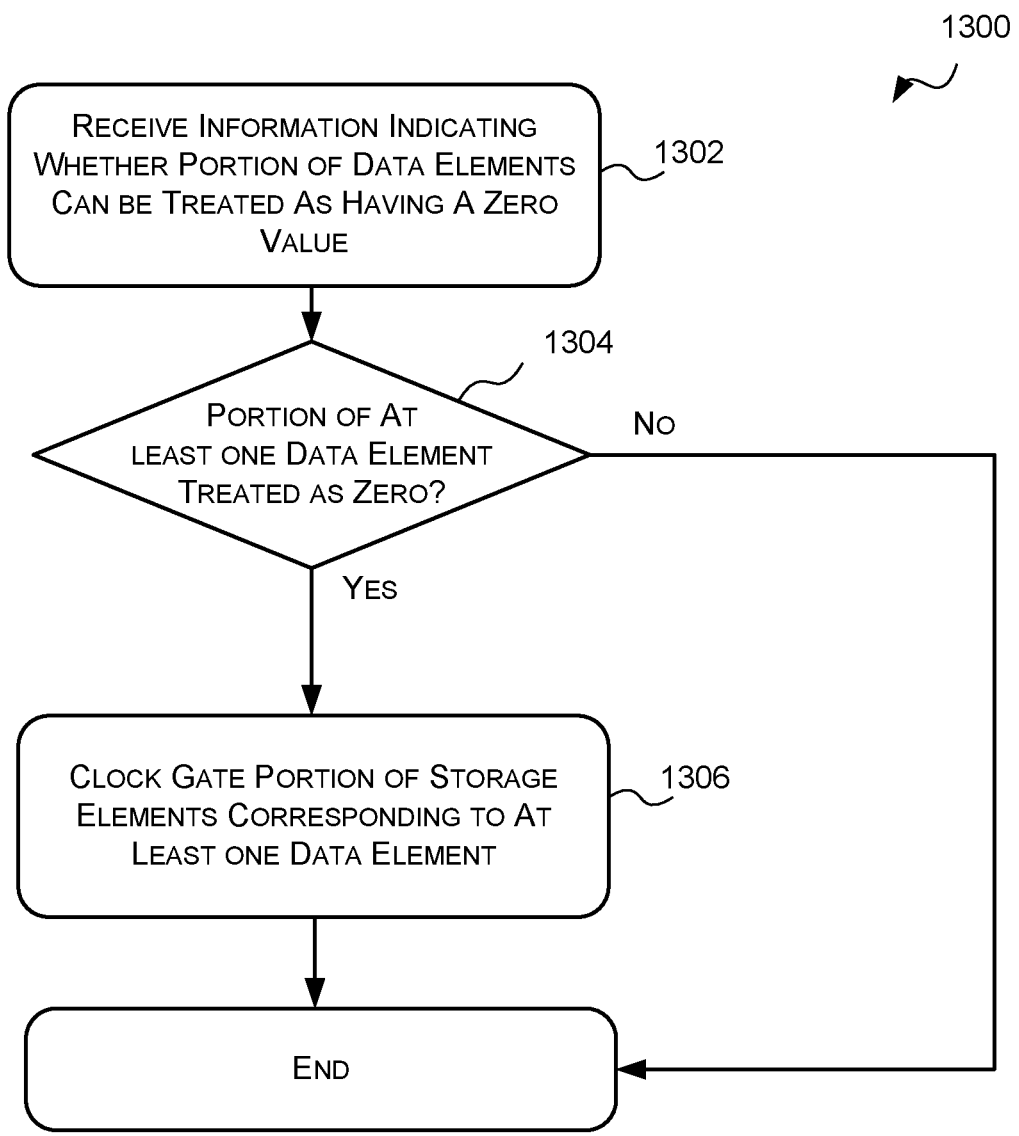
FIG. 13 is a flow diagram of a second example implementation of the method of FIG. 11.

Reference is now made to FIGS. 11 to 13 which are flow diagrams of example methods 1100, 1200, 1300 which may be implemented by the clock gating control logic 302 of FIG. 3 for clock gating the storage elements of a hardware unit 100 for performing matrix multiplication, wherein the hardware unit 100 comprises a plurality of multipliers each configured to multiply data elements to produce an output multiplication data element, and a plurality of adders that form an adder tree to produce a sum of the multiplication data elements by adding data elements from a multiplier or an adder, wherein at least one multiplier and/or at least one adder is preceded by a storage element for each bit of each input data element.

The method 1100 begins at block 1102 where the clock gating control logic 302 receives information indicating whether each data element input to the at least one multiplier and/or the at least one adder can be treated as having a zero value, and/or, indicating whether a portion of each data element input to the at least one multiplier and/or the at least one adder can be treated as having a zero value. As described in more detail below with respect FIGS. 12 and 13 the information indicating whether each data element input to the at least one multiplier and/or the at least one adder can be treated as having a zero value may comprise a bit for each data element indicating whether each data element input to the at least one multiplier and/or the at least one adder can be treated as having a zero value. Once the information indicating whether the data elements input to the at least one multiplier and/or the at least one adder, and/or a portion thereof, can be treated as having a zero value has been received the method 1100 proceeds to block 1104.

At block 1104 a determination is made as to whether the received information indicates that at least one data element input to the at least one multiplier and/or the at least one adder, or a portion thereof, can be treated as having a zero value. If the information indicates that at least one data element input to the at least one multiplier and/or the at least one adder, or a portion thereof, can be treated as having a zero value then the method 1100 proceeds to block 1106. If, however the information does not indicate that at least one data element input to the at least one multiplier and/or the at least one adder, or a portion thereof, can be treated as having a zero value then the method 1100 ends.

At block 1106, all or a portion of the storage elements corresponding to the at least one data element input to the at least one multiplier and/or the at least one adder, or a portion thereof, that can be treated as having a zero value are clock gated. In some cases the method 1100 may end, and in other cases, the method 1100 may proceed to block 1108 and/or block 1110.

At block 1108, the clock gating control logic 302 causes a zero bit to be provided to the corresponding adder or multiplier for each storage element that is clock-gated.

At block 1110, the clock gating control logic 302 generates and outputs information indicating whether the output data element of the at least one multiplier and/or the at least one adder can be treated as having a zero value based on whether the data elements input to the at least one multiplier and/or the at least one adder have a zero value or can be treated as having a zero value. In some cases the clock gating control logic is configured to output information indicating that the output data element of a multiplier can be treated as having a zero value when any of the input data elements to the multiplier can be treated as having a zero value. As described above, this is because if either of the inputs to the multiplier have a zero value (or can be treated has having a zero value) then the output of the multiplier will be zero (or can be treated as having a zero value). In some cases, the clock gating control logic is configured to output information indicating that the output data of an adder can be treated as having a zero value only when all of the input data elements to the adder can be treated as having a zero value. As described above, this is because only if all the inputs to the adder have a zero value (or can be treated as having a zero value) will the output of the adder have a zero value (or can be treated as having a zero value).

Reference is now made to FIG. 12 which illustrates a first example implementation of the method 1100 of FIG. 11 where the storage elements are clock gated on an element basis (i.e. all the storage elements of a data element are clock gated together). The method 1200 begins at block 1202 where the clock gating control logic 302 receives information indicating whether each data element input to the at least one multiplier and/or the at least one adder that can be treated as having a zero value. The information indicating whether each data element input to the at least one multiplier and/or the at least one adder can be treated as having a zero value may comprise a bit for each data element indicating whether each data element input to the at least one multiplier and/or the at least one adder can be treated as having a zero value. In some cases, the information indicating whether each data element input to a multiplier can be treated as having a zero value is configured to indicate that each data element input to the multiplier can be treated as having a zero value if any of the data elements input to the multiplier has a zero value. Once the information indicating whether the data elements input to the at least one multiplier and/or the at least one adder can be treated as having a zero value has been received the method 1200 proceeds to block 1204.

At block 1204, a determination is made as to whether the received information indicates that at least one data element input to the at least one multiplier and/or the at least one adder can be treated as having a zero value. If the information indicates that at least one data element input to the at least one multiplier and/or the at least one adder can be treated as having a zero value then the method 1200 proceeds to block 1206. If, however the information does not indicate that at least one data element input to the at least one multiplier and/or the at least one adder can be treated as having a zero value then the method 1200 ends.

At block 1206 in response to receiving information that indicates that at least one data element can be treated as having a zero value, all the storage elements corresponding to the at least one data element are clock gated. The method 1200 then ends.

Reference is now made to FIG. 13 which illustrates a second example implementation of the method 1100 of FIG. 11 where the storage elements are clock gated on an partial element basis (i.e. it is possible clock gate only a portion of the storage elements of a data element). The method 1300 begins at block 1302 where the clock gating control logic 302 receives information indicating whether a portion of each data element input to the at least one multiplier and/or the at least one adder can be treated as having a zero value. The information indicating whether a portion of each data element input to the at least one multiplier and/or the at least one adder can be treated as having a zero value may comprise the bit widths for the initial sets of data elements. For example, in FIG. 1 the hardware unit 100 receives two sets of data elements—a first set of data elements which generally correspond to the elements of a first matrix and a second set of data elements which generally correspond to the elements of a second matrix. The first set of data elements and the second set of data elements may have bit widths that are less than a maximum bit width and the bit widths may be the same or different between the two sets of inputs. Once the information indicating whether a portion of each data element input to the at least one multiplier and/or the at least one adder can be treated as having a zero value has been received the method 1300 proceeds to block 1304.

At block 1304 a determination is made as to whether the received information indicates that at least a portion of at least one data element input to the at least one multiplier and/or the at least one adder can be treated as having a zero value. In some cases it is determined that the information indicates that at least a portion of at least one data element input to the at least one multiplier and/or the at least one adder can be treated as having a zero value when the bit width of at least one of the sets of initial data elements is less than the maximum bit width. If it is determined that the information indicates that at least a portion of at least one data element input to the at least one multiplier and/or the at least one adder can be treated as having a zero value then the method 1300 proceeds to block 1306. If, however, it is determined that the information does not indicate that at least a portion of at least one data element input to the at least one multiplier and/or the at least one adder can be treated as having a zero value then the method 1300 ends.

At block 1306 in response to receiving information that indicates that a portion of at least one data element input to the at least one multiplier and/or the at least one adder can be treated as having a zero value, a portion of the storage elements corresponding to that data element are clock gated. In some cases N storage elements corresponding to a first data element of a multiplier are clock-gated when the bit width of the first set of data elements is less than a maximum bit width wherein N is equal to the maximum bit width less the bit width of the first set of data elements, and K storage elements corresponding to a second data element of a multiplier are clock gated when the bit width of the second set of data elements is less than the maximum bit width, wherein K is equal to the maximum bit width less the bit width of the second set of data elements. In some cases a portion of both input data elements to an adder are clock gated when the bit width of at least one initial set of data element is less than the maximum bit width. This is because the adders receive data elements that represents a multiplication of a data element from the first set of data elements and a data element from the second set of data elements, thus if the bit width of either set is less than the maximum bit width then the bit width of the multiplication output will be less than the maximum bit width for the multiplication. As described above, when the data elements are most significant bit aligned the storage elements that are clock gated will be the storage elements corresponding to the least significant bits.

Figure 14:
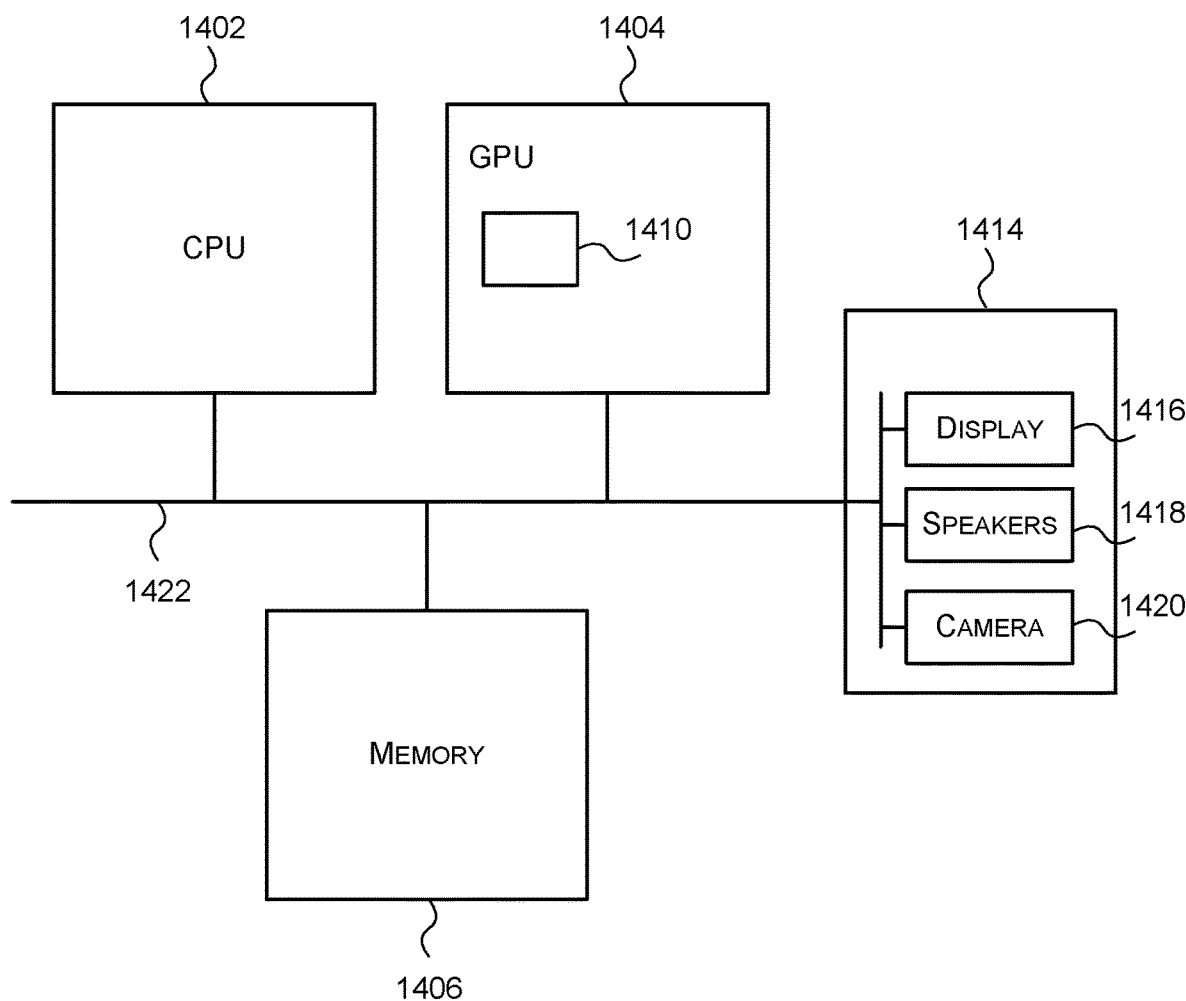
FIG. 14 is a block diagram of an example computer system in which the hardware unit for performing matrix multiplication described herein is implemented.

FIG. 14 shows a computer system in which the hardware unit for performing matrix multiplication as described herein may be implemented. The computer system comprises a CPU 1402, a GPU 1404, a memory 1406 and other devices 1414, such as a display 1416, speakers 1418 and a camera 1420. A hardware unit for performing matrix multiplication 1410 (corresponding to the hardware unit for performing matrix multiplication 100 comprising the control logic 302, 400, 600 or 1000 of FIG. 3, 4, 6 or 10) is implemented on the GPU 1404. In other examples, the hardware unit 1410 may be implemented on the CPU 1402. The components of the computer system can communicate with each other via a communications bus 1420.

The hardware units for performing matrix multiplication and clock gating control units of FIGS. 3, 4, 6 and 10 are shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the functional block at any point and may merely represent logical values which conveniently describe the processing performed by the functional block between its input and output.

The hardware units for performing matrix multiplication described herein may be embodied in hardware on an integrated circuit. The hardware units for performing matrix multiplication described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware unit for performing matrix multiplication configured to perform any of the methods described herein, or to manufacture a hardware unfit for performing matrix multiplication comprising any apparatus described herein. An integrated circuit definition dataset may be, for example, an integrated circuit description.

Therefore, there may be provided a method of manufacturing, at an integrated circuit manufacturing system, a hardware unit for performing matrix multiplication as described herein. Furthermore, there may be provided an integrated circuit definition dataset that, when processed in an integrated circuit manufacturing system, causes the method of manufacturing a hardware unit to perform matrix multiplication to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware unit for performing matrix multiplication will now be described with respect to FIG. 15

Figure 15:
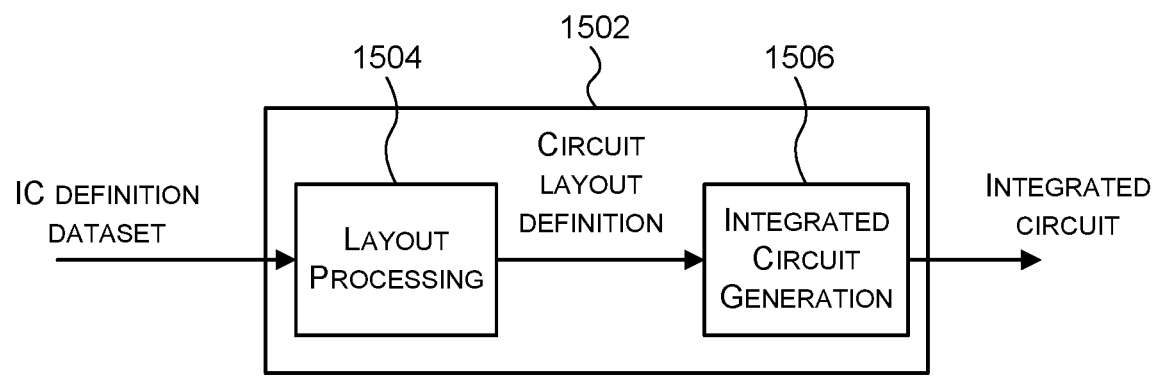
FIG. 15 is a block diagram of an example integrated circuit manufacturing system for generating an integrated circuit embodying a hardware unit for performing matrix multiplication as described herein.

FIG. 15 shows an example of an integrated circuit (IC) manufacturing system 1502 which is configured to manufacture a hardware unit for performing matrix multiplication as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining a hardware unit for performing matrix multiplication as described in any of the examples herein), process the IC definition dataset, and generate an IC according to the IC definition dataset (e.g. which embodies a hardware unit for performing matrix multiplication as described in any of the examples herein). The processing of the IC definition dataset configures the IC manufacturing system 1502 to manufacture an integrated circuit embodying a hardware unit for performing matrix multiplication as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware unit for performing matrix multiplication without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A hardware unit to perform a matrix multiplication, the hardware unit comprising:
   a multiplier stage comprising a plurality of multipliers, each multiplier configured to multiply a first data element and a second data element to produce a multiplication data element;
   one or more adder stages following the multiplier stage that form an adder tree to produce a sum of the multiplication data elements, each adder stage comprising one or more adders, each adder configured to add at least two data elements output by the multiplier stage or at least two data elements output by a previous adder stage in the adder tree to produce an addition data element;
   wherein at least one multiplier and/or at least one adder is preceded by a storage element corresponding to each bit of the data elements input to the at least one adder and/or the at least one multiplier; and
   control logic configured to clock gate all or a portion of the storage elements corresponding to a data element in response to determining that all or a portion of that data element is to be treated as having a zero value.

2. The hardware unit of claim 1, wherein the at least one multiplier and/or the at least one adder comprises a multiplier and the control logic is configured to treat both the first and second data elements as having a zero value if at least one of the first and second data elements input to the multiplier has a zero value.

3. The hardware unit of claim 1, wherein the control logic is configured to clock gate the storage elements on a partial data element basis based on a bit width of the first data element and/or a bit width of the second data element.

4. The hardware unit of claim 3, wherein the storage elements corresponding to each data element are divided into a plurality of blocks which can be independently clock gated, and the control logic is configured to clock gate the storage elements of one or more blocks corresponding to a data element of the at least one adder and/or the at least one multiplier based on the bit width of the first data element and/or the second data element.

5. The hardware unit of claim 3, wherein the at least one adder and/or the at least one multiplier comprises a multiplier and the control logic is configured to clock gate a portion of the storage elements corresponding to the first data element of the multiplier when the bit width of the first data element is less than a maximum bit width.

6. The hardware unit of claim 5, wherein a number of storage elements corresponding to the first data element that are clock gated is equal to the maximum bit width less the bit width of the first data element.

7. The hardware unit of claim 3, wherein the at least one adder and/or the at least one multiplier comprises a multiplier and the control logic is configured to clock gate a portion of the storage elements corresponding to the second data element of the multiplier when the bit width of the second data element is less than a maximum bit width.

8. The hardware unit of claim 7, wherein a number of storage elements corresponding to the second data element that are clock gated is equal to the maximum bit width less the bit width of the second data element.

9. The hardware unit of claim 3, wherein the at least one adder and/or the at least one multiplier comprises an adder and a portion of the storage elements associated with each data element input to the adder are clock-gated when at least one of the bit width of the first data element and the bit width of the second data element is less than a maximum bit width.

10. The hardware unit of claim 3, wherein the data elements are most significant bit aligned and the portion of the storage elements corresponding to a data element that are clock-gated are the storage elements corresponding to the least significant bits of the data element.

11. The hardware unit of claim 1, wherein the control logic is configured to clock gate the storage elements on a per data element basis.

12. The hardware unit of claim 11, wherein the control logic, is configured to receive information indicating which data elements input to the at least one multiplier and/or the at least one adder are to be treated as having a zero value, and in response to determining that a particular data element is to be treated as having a zero value, clock gate all the storage elements corresponding to that data element.

13. The hardware unit of claim 12, wherein the at least one multiplier and/or the at least one adder comprises a multiplier and the information indicating which data elements input to the multiplier are to be treated as having a zero value is configured to indicate that both the first and second data elements of the multiplier are to be treated as having a zero value if at least one of the first data element and the second data element has a zero value.

14. The hardware unit of claim 12, wherein the control logic is further configured to generate information indicating whether the output data element of the at least one adder and/or the at least one multiplier is to be treated as having a zero value based on whether the data elements input to the at least one multiplier and/or the at least one adder are to be treated as having a zero value.

15. The hardware unit of claim 1, wherein the control logic is further configured to, for each storage element that is clock gated, cause a zero bit to be provided to the corresponding multiplier or adder.

16. A method of clock gating storage elements in a hardware unit for performing matrix multiplication, the hardware unit comprising a plurality of multipliers each configured to multiply data elements to output a multiplication data element, and a plurality of adders that form an adder tree to produce a sum of the multiplication data elements, each adder configured to add data elements output from a plurality of multipliers or add data elements output from a plurality of other adders in the adder tree, wherein at least one multiplier and/or at least one adder is preceded by a storage element for each bit of each input data element, the method comprising:

receiving information indicating whether each data element input to the at least one multiplier and/or the at least one adder is to be treated as having a zero value, and/or, indicating whether a portion of each data element input to the at least one multiplier and/or the at least one adder is to be treated as having a zero value; and in response to receiving information that indicates that a data element or portion of a data element is to be treated as having a zero value, clock gating all or a portion of the storage elements corresponding to that data element.

17. A method of manufacturing, using an integrated circuit manufacturing system, the hardware unit as set forth in claim 1, the method comprising:

processing, using a layout processing system, a computer readable description of the hardware unit so as to generate a circuit layout description of an integrated circuit embodying the hardware unit; and manufacturing, using an integrated circuit generation system, the hardware unit according to the circuit layout description.

18. A hardware implementation of a Deep Neural Network "DNN" comprising the hardware unit as set forth in claim 1 configured to compute the convolution associated with one or more convolution layers and/or one or more fully-connected layers of the DNN.

19. A non-transitory computer readable storage medium having stored thereon computer readable instructions that, when executed at a computer system, cause the computer system to perform the method as set forth in claim 16.

20. A non-transitory computer readable storage medium having stored thereon a computer readable description of the hardware unit as set forth in claim 1 that, when processed in an integrated circuit manufacturing system, causes the integrated circuit manufacturing system to manufacture an integrated circuit embodying the hardware unit.

* * * * *

UNITED STATES PATENT AND TRADEMARK OFFICE
CERTIFICATE OF CORRECTION

| | |
|---|---|
| PATENT NO. | : 11,321,096 B2 |
| APPLICATION NO. | : 16/180181 |
| DATED | : May 3, 2022 |
| INVENTOR(S) | : Martin et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this
Twenty-ninth Day of November, 2022

Katherine Kelly Vidal
*Director of the United States Patent and Trademark Office*